United States Patent
Huang et al.

(10) Patent No.: US 6,266,165 B1
(45) Date of Patent: Jul. 24, 2001

(54) METHOD FOR MORPHING N-DIMENSIONAL DATA USING A SCATTERED DATA TRANSFORMATION

(75) Inventors: Xuan-Chao Huang; Brant Dennis Nystrom, both of Lexington; Richard Lee Reel, Georgetown, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/163,652

(22) Filed: Sep. 30, 1998

(51) Int. Cl.$^7$ .................... G03F 3/08; G06K 9/00
(52) U.S. Cl. .................... 358/520; 382/162
(58) Field of Search .................. 358/518, 520; 382/162, 167

(56) References Cited

U.S. PATENT DOCUMENTS

| 5,289,295 | 2/1994 | Yumiba et al. | 358/518 |
| 5,539,540 | 7/1996 | Spaulding et al. | 358/518 |
| 5,583,666 | 12/1996 | Ellson et al. | 358/518 |
| 6,151,136 | * 11/2000 | Takemoto | 358/1.9 |

* cited by examiner

*Primary Examiner*—Kimberly A. Williams
(74) *Attorney, Agent, or Firm*—Frederick H. Gribbell

(57) ABSTRACT

An improved "scattered data transformation" method for warping/morphing color data is provided to transform n-dimensional data so that only selected regions of the n-color space are modified. The method uses a set of "input points" that are chosen to represent the color gamut for an input color space. In addition, a set of "training points" having associated "training vectors" are chosen in the input color space, and the training points are used to define the transform output for the input points in the color input space. Some (or all) of the input points may also be training points, but it is not necessary that any of the input points be training points. The vector displacement effect of the preferred embodiment is both exponentially and inversely proportional to the distance of each of the input points to one or more of the training points so that, the closer a training point is to an input point, the greater the effect of that training point on that input point. If a training point is located beyond a pre-determined distance from an input point, then it will have no effect at all on that input point. A refinement of the present invention is to weight the vectors for the training points, so that certain training points can become much more "important" than others when modifying the input color space to the output color space.

25 Claims, 20 Drawing Sheets

METHOD FOR MORPHING N-DIMENSIONAL DATA USING A SCATTERED DATA TRANSFORMATION

TECHNICAL FIELD

The present invention relates generally to color printing equipment and is particularly directed to transforming an input color space into an output color space which is more suitable for a particular style of color printer. The invention is specifically disclosed as a scattered data transformation method that uses training points and training vectors to define the effect on input points existing in the input color space in a manner that localizes the transforming effect on each of the input points due to the training points and training vectors.

BACKGROUND OF THE INVENTION

Color image devices have become quite common, not only in televisions and computers CRT displays, but also in color printers such as ink jet printers. Color data operations and manipulations vary widely between the different types of color imaging devices. To ensure a quality color image, different approaches to color rendering are required based on the physics and operating characteristics of the device being characterized, and different imaging technologies utilize different primary colors. For example, devices which emit light to create color (e.g., televisions and CRT displays) use the additive color mixing primaries red, green, and blue ("RGB") to create all of the colors within their color gamut (i.e., the range of all displayable colors). In addition, devices which use reflected light to create color (e.g., printers) use the subtractive color mixing primaries cyan, magenta, and yellow (CMY) to obtain a wide gamut (in this case, the range of all printable colors) of colors. For an RGB image displayed on a CRT to look as good as a CMY print made by a color ink jet printer, a color conversion is required to convert the RGB input data to CMY output data. Oftentimes, conventional color data transformations required for the color conversion are mathematically and/or computationally complex.

It is common to refer to the gamut of colors associated with an imaging device as a "color space." The color space associated with digital color imaging devices is generally specified as a three-dimensional entity (because the human visual system is trichromatic). The coordinates of a color space can vary from input RGB data, to output CMY data, or to coordinate systems which mimic the response of the human visual system. The most common of these coordinate systems is CIELAB, which utilizes three coordinates (L*, a*, and b*) to characterize any color. The L* coordinate represents the lightness of a color. L* values range from 0 to 100, where zero (0) represents black and 100 represents white. The second coordinate, a*, represent the redness or greenness of a color. An a* value of zero (0) corresponds to a color that is neutral between red and green. A positive a* value represent a redish color while a negative a* is greenish. The third coordinate, b*, is similar to a*, except that it represents a tradeoff between yellowness and blueness, rather than redness and greenness.

Developers of today's color imaging systems commonly transform color information between many color spaces in the process of characterizing a printing or displaying device. Generally, the mathematical manipulation of color information is performed in a so-called "device independent color" space, such as CIELAB, to ensure that the operations are being performed in a way consistent with the way in which people see. The original data can be considered as existing in an "input color space" and, after the data transformation, the color space can be called an "output color space."

In situations where one type of physical device (such as a color monitor) has received a set of color data that corresponds to its format, and then that color data is desired to be utilized with a different type of physical device (such as a color printer), then it will be obvious that the color gamut will have to be significantly modified when transforming the color data from one format to the other. In other situations, a color space may be defined for a particular type of physical device (such as a color printer), however, improvements are desired for certain portions of the color space, and again, a transformation is required to create a new look-up table of colors to be used with the physical output for the device of interest. In general, a "warping" or "morphing" algorithm is used to transform either two-dimensional or three-dimensional data to create the new, improved color space. Such warping/morphing algorithms have been used in the past, with varied results.

One standard approach is known as "polynomial warping" which has certain drawbacks. For example, polynomial warping requires inversion of a large ill conditioned matrix which is numerically and computationally impossible due to the size of the matrix and floating point precision problems. In addition, if a "training point" (a point that is hand-picked by the color space system designer to have a certain input coordinate and a certain corresponding output coordinate) also happens to be an "input point" (i.e., a point in the input color space that will be transformed into the output color space), then the output point corresponding to that input point is generally not exactly defined by that training point. Furthermore, the effects of a training point are not localized to that training point within the color space, and in fact can have a significant effect over the entire transformed output color space.

Another standard approach is known as an inverse distance interpolation (also known as "Shephard's Method"). In the inverse distance interpolation method, if the training points are "do nothing" training points, the transform does not degenerate into an identity transform, in that the transform will actually modify the non-training point even though the training points are such that input equals output. Moreover, the effects of a training point are not generally localized to that training point.

Other conventional methods for modifying color space have been patented, including U.S. Pat. No. 5,289,295 (by Yumiba), which discloses a color adjustment apparatus that includes a color space conversion circuit that obtains a chromaticity signal in a rectangular coordinate system of a plane representing hue and saturation components. Instead of using the uniform color space expression of color, L*a*b*, this Yumiba invention uses the CIE 1976 uniform observer color space coordinates, L*u*v*. Using a two-dimension coordinate system, the "original chromaticity signal" having the values (u*, v*) are converted to a "corrected chromaticity signal" called ($u_o$*, $v_o$*). This corrected chromaticity signal is used to create a "target color chromaticity signal" ($u_{oh}$*, $v_{oh}$*) which is used to convert the entire color plane. A "pointed color chromaticity signal setting circuit" creates the converted chromaticity signal ($u_o$*, $v_o$*). A "target color chromaticity signal setting circuit" is used to create the target color chromaticity signal ($u_{oh}$*, $v_{oh}$*).

A particular area of color space can be affected by a "target color chromaticity signal" which affects certain points to a greater extent if these points are spaced closely to a particular target point that is chosen by the "pointed color chromaticity signal setting circuit." In other words, a single rectangular coordinate point is chosen as the center of the target area, and the color adjustment area has all of its multiple points affected to a certain degree, but the points most closely spaced to the center of that adjustment area are most affected. The Yumiba device can be used as an instantaneous color adjustment device (e.g., for a color TV or a color monitor).

U.S. Pat. No. 5,583,666 (by Ellson) discloses a method for transforming an input color space to an output color space where each of a plurality of specified colors or color regions are constrained to be transformed by one or more explicitly specified color calibration or color enhancement strategies. The constraints are applied to a subset of the points in the input color space that specifies the transform used to create the corresponding points in the output color space. The remainder of the points are then transformed by a mapping strategy that preserves color continuity. In the preferred embodiment, the mapping strategy is a computer graphics geometric morphing technique. Also in the preferred embodiment, the color transformation is implemented using multi-dimensional look-up tables.

The example discussed in Ellson's preferred embodiment takes an RGB signal used for a color monitor and converts it to a signal useful for a Kodak XL7700 color printer. Using this example, one of the strategies is to maintain some of the colors, such as flesh colors or grass colors of photographs, so that these color shades do not change from the input color space to the output color space. The subset of points that will maintain these flesh tones or grass tones will be such that the specific points will not move very much, or will not move at all, when comparing the input color space to the output color space. On the other hand, another subset of the points will move points in the input color space to the output color space so that saturated colors or primary colors maintain the proper "look" for output by the printer (i.e., the output color space) as compared to the proper "look" for the output by the color monitor (i.e., the input color space). The method used is shown in a flow chart on FIG. 4, in which more than one subset of input color values is transformed (per subset) to appropriate output color values. After that occurs, a final subset is created that contains all of the "remaining" input color values (i.e., those values that were not previously defined as being part of one of the controlling subsets). Then a color transform is created for these remaining input color values which will preserve continuity between the other subsets that specify each input point and output point. The final step is to implement a combined transform for all of the points.

FIG. 5 of Ellson shows a description of various mapping strategies, which show a point constraint, line constraint, surface constraint, and volume constraint. These different types of constraints are used for different situations. For example, a point constraint could be used for a single color, such as a skin tone. A surface constraint could be used to constrain the surface of the "color gamut," in which the term "gamut" refers to the range of colors that can be represented or displayed at a particular stage in the hardware system.

The way that input colors are assigned to the color space is to use a lattice in three dimensions, which corresponds to the three-dimensional space of three different colors (e.g., the primary colors). Each input point is assigned a three-dimensional number that corresponds to one of the nodes in the lattice. If a finer resolution is required, then an input point can be assigned a location that is interpolated between lattice nodes. If the output color space is of the CIELAB specification, then each node of the lattice would have an associated L*a*b* coordinate. The nodes that are contained in the set of constrained colors are tagged to be fixed nodes, and their coordinates are determined depending upon the selected color mapping strategy. The initial coordinates of the remaining unconstrained nodes in the lattice can either be set to the color value of a node in the input color space or can be interpolated from a subset of the constrained points.

One major consideration is to maintain continuity and smoothness between nearby color values when using the color mapping function. The initial node coordinates will not generally satisfy the continuity and smoothness conditions because of the use of different color mapping strategies for different subsets of constrained colors. To restore the desired continuity and smoothness, a "cost function" is defined which is a quantitative measure of the irregularity of the node lattice. By analogy, the cost function is defined as the net force on a mass connected by a system of mechanical springs to nearby masses. In the preferred embodiment, the cost function for each node is a function of the color difference which is represented by the length of the connections between nodes and their "nearest" and "second-nearest" neighbor nodes. The cost function of each node is, by analogy, the magnitude of the net force upon the corresponding mass imposed by the connecting springs. Since the rest lengths of the springs vary smoothly, the lowest cost positions of the masses will also have smoothly varying spacings. This will correspond to smoothly varying output color differences.

To determine the minimum cost node coordinates, the total cost is calculated for the current node coordinates. This total cost is then compared to the convergence requirement (which is not specified in this patent). If convergence is not achieved, the node coordinates are changed in proportion to the local vector value of the cost function. The mass is moved as a function of the net force applied according to the conventional mechanical model. When convergence is reached, the final note coordinates are recorded in output space. The final node coordinates effectively comprise a multi-dimensional look-up table that can be used to calculate the color value corresponding to each input color value, subject to the quantization limit of the output device.

In the example of Ellson's FIG. 11, the RGB input color space is divided into three subsets. The first subset is the collection of the most saturated color values. The second subset is a collection of relatively unsaturated color values that are commonly found in photographic scenes. The remaining subset comprises the remaining points that are mapped in a manner that preserves continuity between the first two subsets.

U.S. Pat. No. 5,539,540 (by Spaulding) discloses a method for transforming an input color space to an output color space where each of a plurality of specified color attributes grouped by subsets are transformed by a specific transform each, and the remaining input colors are transformed to a certain extent while being constrained by "boundary values" based upon the previously-defined subset values. The precise manner in which the "boundary values" are chosen is not described in detail. "Gamut boundaries" of specific types of equipment are mentioned which, however, are not the same thing as the "boundary values" of the above-noted transformations. In the preferred embodiment, the neutral input color values are extracted from the input color space. This is used as the first subset of input color values. The second subset of input color values in the preferred embodiment comprise highly saturated input color values. The third and final subset of input color values are the remaining values that were not defined in the previous subsets. After all of these values have been divided into respective subsets, all the input color values are transformed by the individual transforms specified for each subset.

In one example of the preferred embodiment, the hue angles of the primary colors are shifted to account for the differences between the input apparatus (e.g., such as a color monitor) and the output apparatus (e.g., such as a Kodak XL7700 thermal color printer). This Spaulding patent shows how the hue angles can be either fully shifted or partially shifted to adjust the hue angles from the input apparatus to the output apparatus. A general equation is provided, although in the preferred embodiment there will be saturation compression of the primary colors, since the printer's gamut boundary is smaller than the color monitor's gamut boundary.

Spaulding's preferred embodiment discloses some equations to perform saturation correction as a function of the input color value, and also shows equations for performing lightness correction as a function of the input color value. In Spaulding, the hue, saturation, and lightness shifts for each of the six primary colors can be individually adjusted, thereby giving eighteen degrees of freedom. The RGB input color space is divided into three subsets. The first subset is the collection of the most saturated color values. The second subset (in one example) is a collection of relatively unsaturated color values of the type commonly found in photographic scenes. The final subset comprises the remaining colors that are mapped in a manner to preserve continuity between the first two subsets. In this regard, this example in Spaulding is almost identical to the above-discussed Ellson patent.

It would be very desirable to create a warping/morphing method to transform color data (in n-dimensions) so that only selected regions of the n-space are modified. It would also be desirable to provide a warping/morphing method in which the transform is derived from a set of training points that define the transform output for selected points in the transform input space. It would further be desirable to provide a warping/morphing method in which a training point that also comprises an input point that is to be transformed will create an output point that becomes defined exactly by that training point and its associated vector. Finally, it would be desirable to provide a warping/morphing method of transforming color data such that the effects of a training point are generally localized to that training point.

SUMMARY OF THE INVENTION

Accordingly, it is a primary object of the present invention to provide a scattered data transformation method capable of transforming n-dimensional data so that only selected regions of the n-space are modified.

It is another object of the present invention to provide a scattered data transformation method that provides both input points and training points, in which the transform is derived from a set of training points such that the transform output is defined for selected points in the transform input space.

It is a further object of the present invention to provide a scattered data transformation method in which both the input points that are to be transformed and the training points do not need to be uniformly spaced.

It is yet another object of the present invention to provide a scattered data transformation method in which the training points do not need to be a subset of the input points that are to be transformed, however, if a training point is also an input point that is to be transformed, then the transform of that input point will be defined exactly by that training point.

It is yet a further object of the present invention to provide a scattered data transformation method in which the effects on input points in the input color space of a training point are generally localized to that training point within the input color space.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved color data warping/morphing method is provided to transform n-dimensional data so that only selected regions of the n-color space are modified. The method of the present invention is referred to as a "scattered data transformation" and uses a set of "input points" that are chosen to represent (typically in a rather comprehensive manner) the entire color gamut for the input color space. In addition, a set of "training points" having associated training vectors are chosen that are positioned in the input color space, such that the training points are used to define the transform output for the selected input points in the color input space. This is accomplished by using an equation having the general form of: $Y_i = X_i + dX_i$ (i=1, . . . ,N); where $X_i$ represents the set of input points in input color space; $dX_i$ represents a vector quantity which affects the original positions of the input points, and is dependent upon the locations of nearby training points; and $Y_i$ represents the (now transformed) set of output points in output color space.

In the preferred embodiment of the present invention, the scattered data transformation is performed to re-adjust the positions of the input points so as to create an output color space that can be used in conjunction with a color printer. The term color space is used to represent the gamut of colors associated with an imaging device, such as Red-Green-Blue (also called "RGB"), Cyan-Magenta-Yellow (also called "CMY"), L*a*b*, or Cyan-Magenta-Yellow-Black (also called "CMYK"), typically used in color monitors or color printers. The present invention preferably uses one of the industry standard representations of color space, known as the CIELAB color space.

The present invention begins by choosing a set of training points, which comprises list of "starting points" in the input color space, and a list of displacement vectors (i.e., "training vectors") that determine the respective ending positions in the output color space for these training points. Some of the training points may have a displacement vector with zero magnitude; this is particularly true if certain colors in the input color space are properly represented at the start, and therefore, no change is desired. In that circumstance, the training points located at such colors (possibly including neutral and primary colors) are not displaced, so that their ending positions in the output color space are placed at the same locations on the color coordinate system as their respective starting locations.

On the other hand, there are times where it is determined that certain of the input points are not in the most desired positions within the input color space. Training points from these areas should be "corrected," and their corresponding ending positions are moved (by appropriate training point displacement vectors) with respect to their starting positions.

By wisely choosing the "moving" training points, a particular color hue, for example, can be corrected without disturbing the other colors in the input color space that do not need any adjustments.

In the present invention, input points are also chosen in the input color space, and will be transformed by a vector displacement quantity based upon the scattered data transformation. Some (or all) of the input points may also be training points, but it is not necessary that any of the input points be training points. The vector displacement effect of the preferred embodiment is both exponentially and inversely proportional to the distance of each of the input points to one or more of the training points (as will be described in greater detail hereinbelow).

If one or more nearby training points are displaced between their starting positions and ending positions in the color space (i.e., if there is at least one "moving" training point rather than a "stationary" training point nearby to the respective input point), then a particular input point will also be displaced to a new location (where it is then called an output point in the transformed output color space), essentially in a similar or the same direction as a nearby training vector, and by a magnitude that is defined by the inversely exponential equation.

If the input point is greater than a certain distance in the input color space from a training point (whether moving or non-moving), then it will be less effected (from a displacement standpoint) by that particular training point, which is defined by a polynomial equation (as will be described in greater detail hereinbelow). Finally, if the input point is at an even greater distance in the input color space from a particular training point, then the input point is not affected at all by that training point. In other words, the beginning and ending locations of such an input point will comprise the same location in the color space coordinate system (at least with respect to all training points located at the greater distance—a "radius of effect"—from the input point).

When the input points are selected, it is important to note that these input points do not need to be uniformly spaced for the present invention. Moreover, the training points also do not need to be uniformly spaced. Furthermore, the training points do not need to be a subset of the points that are to be transformed, however, if a training point also is an input point that is to be transformed, then the transform of that input point will be defined exactly by that particular training point and its associated training vector. If none of the training points move between the input color space and the output color space, then the transform degenerates into an identity transform (as opposed to prior art color transforms).

The effects of a training point are generally localized to that particular training point. This is accomplished by defining the movement of an input point in the input color space as it is re-located into the output color space by a set of equations that relate to the proximity of the input point to one or more training points in the input color space, as briefly discussed above. The equations are chosen such that the more closely spaced an input point is to a particular training point, then the more pronounced the effect of that training point will be on that particular input point. In the preferred embodiment, a "radius of effect" is chosen by the color space system designer within n-dimensional color space. If a training point is outside the radius of effect for a particular input point coordinate, then that training point will have absolutely no effect on that input point.

On the other hand, if the training point is within the radius of effect for that particular input point, then the movements (or lack thereof) of the training point due to its training vector between input color space and output color space will have an effect on the input point as it is transformed into the output color space. In the preferred embodiment, if the training point is sufficiently close to the particular input point in question, then the movement of the training point along its training vector will have a pronounced effect on the input point's final location in output color space (and this effect is defined by an inverse exponential function).

The distance between an input point and the training points in the input color space is analyzed using vector geometry in n-dimensional space. The scalar magnitude of this distance is used in the functional calculations that will define effect upon the input point as it is moved (or not moved) into its final position in the output color space. One refinement of the method of the present invention is to divide the training vectors into equal length segments, and perform the transformation calculations in an iterative fashion, such that the input points are only fractionally moved to their final output space positions by each of the iterations. The number of iterations could be manually chosen by the color systems engineer, however, it is preferred that the number of iterations be related to the maximum training vector length for a particular data set, and also be related to the minimum distance between any two input points for a particular data set in input color space.

While the scattered data transformation method of the present invention is very useful for transforming n-dimensional data so that only selective regions of the n-space are modified, the present invention could also be used to completely redefine a color gamut for a particular color space. This would be done by intelligent selection of training points such that, instead of only attempting to correct a certain relatively small area of the input color space, the training points could be selected along with their training vectors to modify the entire color gamut boundary, as well as re-define the particular hues of any of the colors necessary between the input color space and the output color space.

Another refinement of the present invention is to weight the vectors for the training points, so that certain training points can become much more "important" than others when modifying the input color space to the output color space. While the weighting factors are frequently selected as integers, there is no need for these numbers to be constrained to integers.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 6 depicts only a small portion of the chart of FIG. 5 so as to magnify the graphical representation near the zero Y-axis.

DETAILED DESCRIPTION OF THE PREFERRED EMBODIMENT

Figure 1:
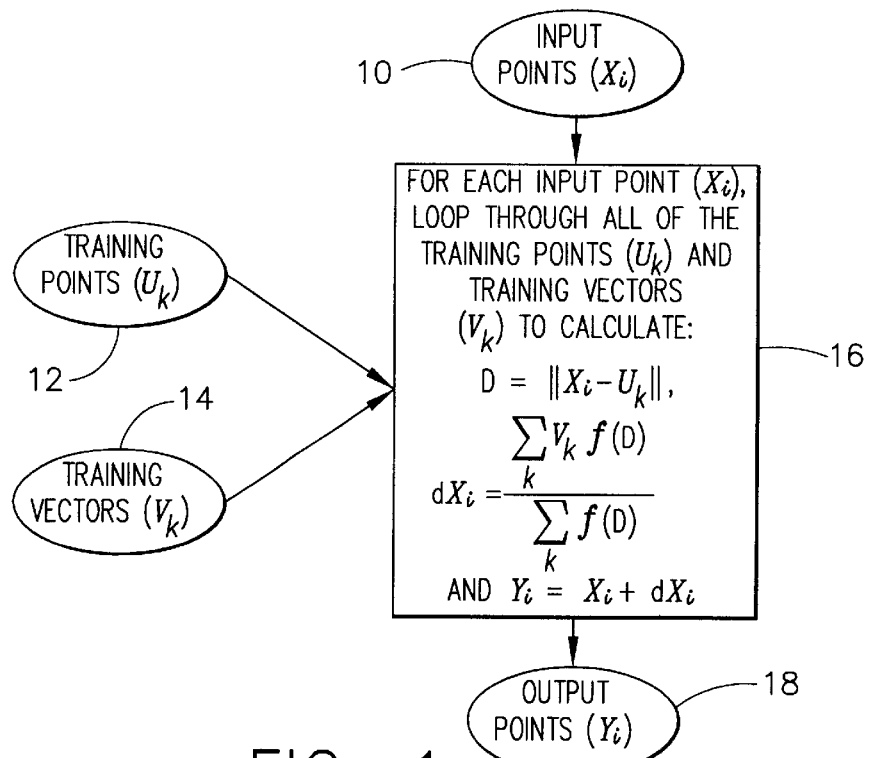
FIG. 1 is a flow chart of the scattered data transformation method of the present invention in which no iterations are performed and no training point weights are used.

Reference will now be made in detail to the present preferred embodiment of the invention, an example of which is illustrated in the accompanying drawings, wherein like numerals indicate the same elements throughout the views.

The present invention provides a warping/morphing method that can transform n-dimensional data so that only selective regions of the n-color space are modified. The transform has the following properties:

1. "Input points" that are to be transformed do not need to be uniformly spaced.
2. The transform is derived from a set of "training points" that define the transform output space for selected points in the transform input space.
3. The training points do not need to be a subset of the points that are to be transformed.
4. The training points do not need to be uniformly spaced.
5. If a training point is also an input point that is to be transformed, then the transform of that input point will be defined exactly by the training point.
6. If all of the training points are "do nothing" training points (i.e., the training points are all of zero magnitude), the transform degenerates into an identity transform (where input equals output for all points to be transformed).
7. The effects of a training point are generally localized to that training point.

The data transform method of the present invention is very useful when adjusting color points in an ink jet printer color gamut. If digital mapping into a particular color gamut has been developed with good overall results, but the blue colors, for example, appear to be slightly purple, then the method of the present invention can adjust the blues in question while leaving the rest of the mapping function relatively unchanged.

As will be understood by one skilled in the art, a method for adjusting the "color space" used by a printer is typically performed "off line" so that the relatively complex calculations are performed in advance of any print job processing time that is normally performed by a host computer or a printer. In the preferred embodiment of the present invention, such is also the case, and the calculations that are described in the equations hereinbelow are preferably performed for three-dimensional space, or possibly four-dimensional space. Examples provided herein are given in two-dimensional space, since three-dimensional and four-dimensional examples are very difficult to illustrate and to visualize.

The present invention will also be referred to herein as a "scattered data transformation method," which was originally developed for two-dimensional data (and has been tested with both two-dimensional data and three-dimensional data), however, is generalizable to n-dimensions. In this explanation, the equations will be presented with n-dimensional vectors for the sake of simplicity. This method initially begins with an input color space having a set of "input points" designated as: $X_i$ (i=1 ..., N—where N is the number of input points), and begins with a set of "training data." The training data consists of a set of "training points" designated as $U_k$ (k=1 ..., M—where M is the number of training points), which are in the same color space as the input points (in the pre-transform input space), and a set of "training vectors" designated as $V_k$. The training vectors are vector displacements of the training points $U_k$ into transformed space (i.e., output color space), and training "weights" (which are scalars) designated as $w_k$, which are the relative weights given to each of the training points. The training points $U_k$ need not be a subset of the input points $X_i$.

The scattered data transformation of the present invention is quite useful in correcting a particular area of the input color space by locating training points $U_k$ and moving them toward desired output locations in the output space, designated as a set by the equation $U_k+V_k$. Of course, for areas of the input space that do not require any color correction, then the vectors $V_k$ will most likely have a zero (0) magnitude for their vector quantity, and training points $U_k$ in those areas will not move from the input color space to the output color space.

On FIG. 1, a flow chart is presented showing the basic steps of one example of the scattered data transformation method in which there are no training point weights, and there are no iterations performed during the calculations on the input points as they are transformed into their output point locations in the output color space. This iteration aspect will be described in greater detail hereinbelow. The set of input points $X_i$ is chosen by the color systems engineer and designated by the reference numeral 10 on FIG. 1. The set of training points $U_k$ is chosen and designated by the reference numeral 12 on FIG. 1. The set of training vectors $V_k$ is chosen and designated by the reference numeral 14 on FIG. 1.

A function block 16 on FIG. 1 performs all of the necessary calculations to determine the "output points" $Y_i$ that will be created from the set of input points $X_i$. These output points are grouped as a set designated by the reference numeral 18 on FIG. 1. According to the present invention, there will be a corresponding output point for each of the input points. A "transform equation" is used to convert the set of input points into the set of output points, and the general form of this transform equation is given as "Equation #1," immediately below:

$$Y_i = X_i + dX_i (i=1, \ldots, N) \qquad \text{EQUATION \#1}$$

To calculate the set of output "transformed" points using Equation #1, the values for the quantity $dX_i$ must be determined from the following Equation #2:

$$dXi = \frac{\sum_{k=1}^{M} w_k \cdot V_k \cdot f(D_{ik})}{\sum_{k=1}^{M} w_k \cdot f(D_{ik})} \qquad \text{EQUATION \#2}$$

The form of Equation #2 provided above is the general form of this equation, which provides a weighted average of the training vectors, but on FIG. 1, function block 16 uses no weighting, and the weighting factors $W_k$ are set equal to one (1).

To calculate the result $dX_i$ from Equation #2, a function of $D_{ik}$ $\{f(D_{ik})\}$ must be determined, and also the values of the distance variable $D_{ik}$ must also be calculated. This distance $D_{ik}$ represents the magnitude of a vector quantity that measures the distance from the particular input point $X_i$ to a particular training point $U_k$. This distance is calculated in Equation #3, provided immediately below:

$$D_{ik} = \|X_i - U_k\| \qquad \text{EQUATION \#3}$$

The function of the variable $D_{ik}$ is chosen as a monatonic decreasing function with $f(0) = \infty$ and $f(\infty) = 0$. In the preferred embodiment, the general form of this function $f(D_{ik})$ is provided in Equation #4 provided immediately below:

$$f(D_{ik}) = \frac{1}{D_{ik}^u} \qquad \text{EQUATION \#4}$$

The variable u above is generally equal to the numeral two or three. Equation #4 has the advantage of being simple and well behaved, but also has the disadvantage that the remotely located training points (in which $D_{ik}$ is very large) still has a small but non-zero weight. Therefore, it is preferred that the equation for $f(D_{ik})$ go to zero at some value of $D_{ik}$. While the shape of this function at values where $D_{ik}$ is very small is desirable, it is also desired that this function has a value that goes to zero at a particular distance where $D_{ik} = r$. The variable "r" in essence is a "radius of effect," so that if a training point in the input color space is positioned beyond this radius, then the weight of that training point as far as it can affect a particular input point in the input color space will be null. Therefore, beyond this radius r, it is desired that the function $f(D_{ik})$ is equal to zero for values of $D_{ik}$ greater than or equal to r.

It is preferred that the function $f(D_{ik})$ be an inversely cubed function for values of $D_{ik}$ less than or equal to r/2, however, for values between r/2 and r, a polynomial equation is used for this function. The preferred result is provided in Equation #5, provided immediately below:

$$f(D_{ik}) = \begin{cases} \frac{1}{D_{ik}^3} \text{ if } D_{ik} \leq \frac{r}{2} \\ \frac{-768}{r^8} \cdot D_{ik}^5 + \frac{3072}{r^7} \cdot D_{ik}^4 + \frac{4864}{r^6} \cdot D_{ik}^3 + \frac{3840}{r^5} \cdot D_{ik}^2 + \frac{1536}{r^4} \cdot D_{ik} + \frac{256}{r^3} \text{ if } < D_{ik} < r \\ 0 \text{ if } D_{ik} \geq r \end{cases} \qquad \text{EQUATION \#5}$$

Figure 5:
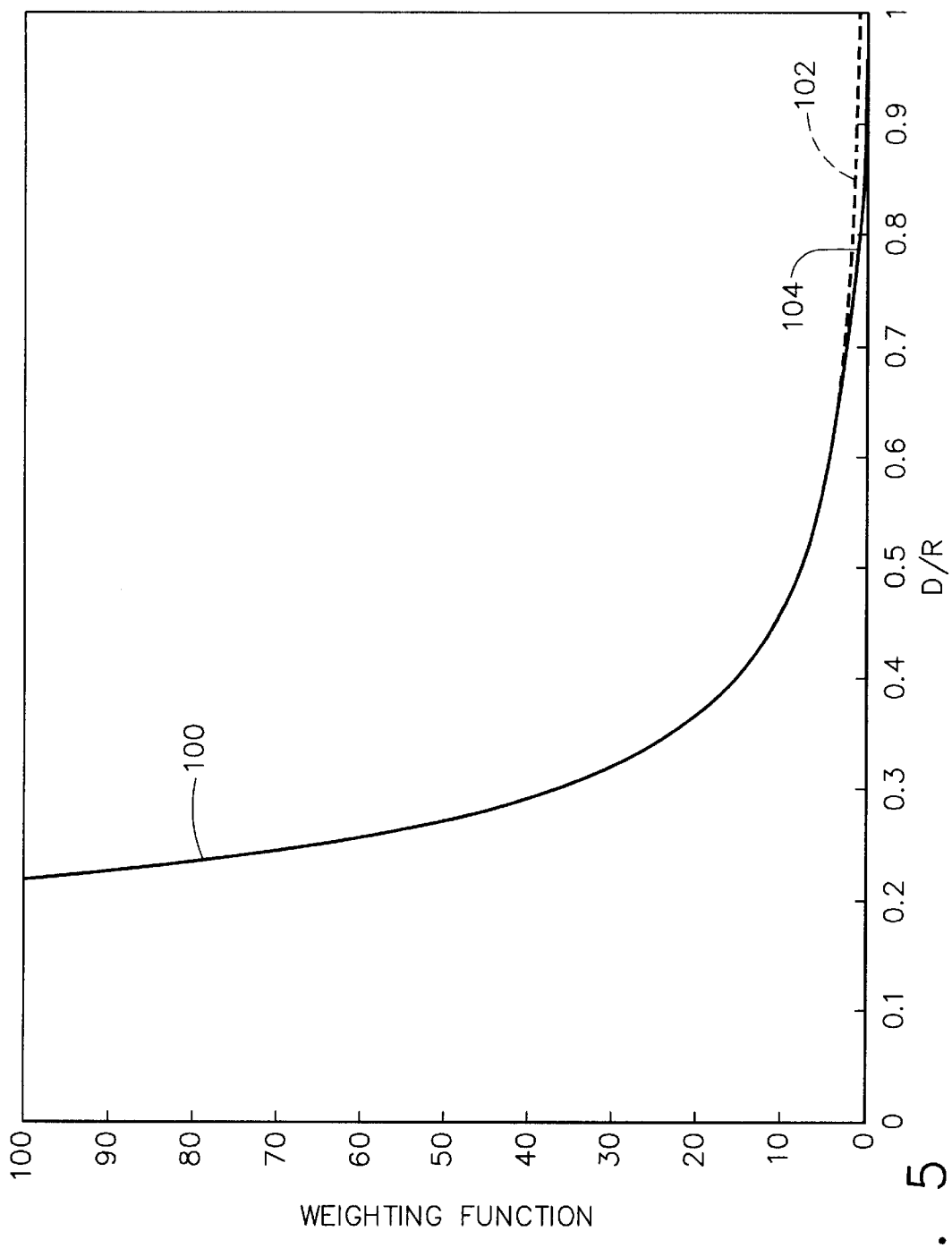
FIG. 5 is a chart showing the distance weighting functions used in the scattered data transformation of the present invention.
Figure 6:
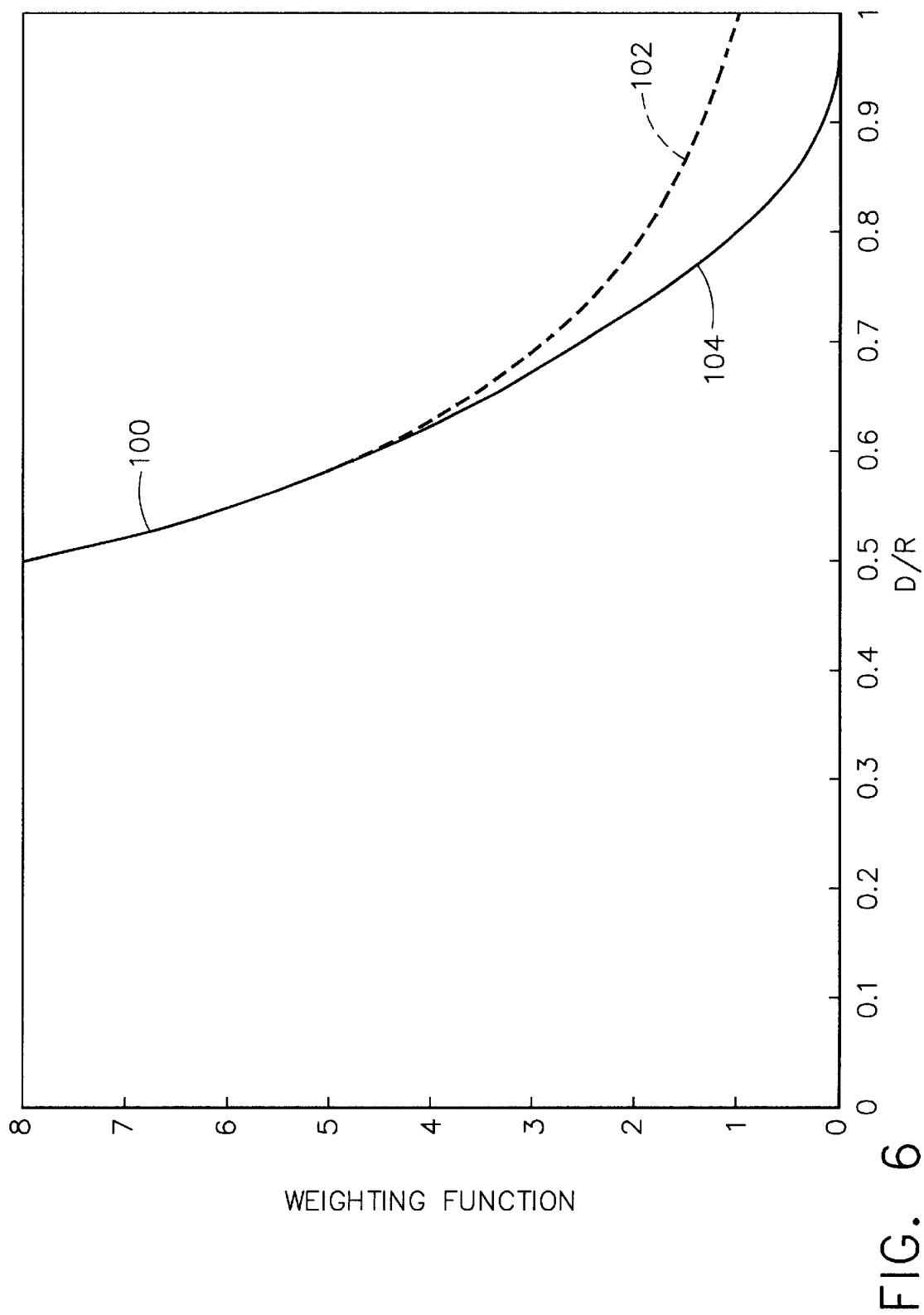
FIG. 6 is another chart similar to that of FIG. 5, however.

As can be seen on FIGS. 5 and 6, the curve 102 represents the inversely cubed function of $1/D^3{}_{ik}$, which has the undesirable trait of not equaling zero (0) at the value on the graph where d/r is equal to one (1). However, the polynomial equation portion of Equation #5 is depicted on the graphs of FIGS. 5 and 6 at the curve 104, and this curve does have the desirable trait of equaling zero (0) at the value of d/r equals 1. This polynomial also has the desirable trait of equaling the value eight (8) at the X-axis value of d/r equals 0.5, and therefore, intercepts the inversely cubed function at that point. For values along the X-axis of d/r between 0 and 0.5, the curve 100 is used for the function (which is the $1/D^3{}_{ik}$ curve).

In Equation #5, the value for r is defined by the color systems engineer, and determines where the weight of a training point goes to zero. This function $f(D_{ik})$ is not simple, but it is well behaved since the function as well as its first and second derivatives are continuous, and the remote training points have zero weight. When this function is used in the function block 16 on FIG. 1, the calculations of Equations 1, 2, 3, and 5, are all made for each input point $X_i$ by looping through all of the training points $U_k$ and training vectors $V_k$. The final result is the set of output points $Y_i$.

Figure 2:
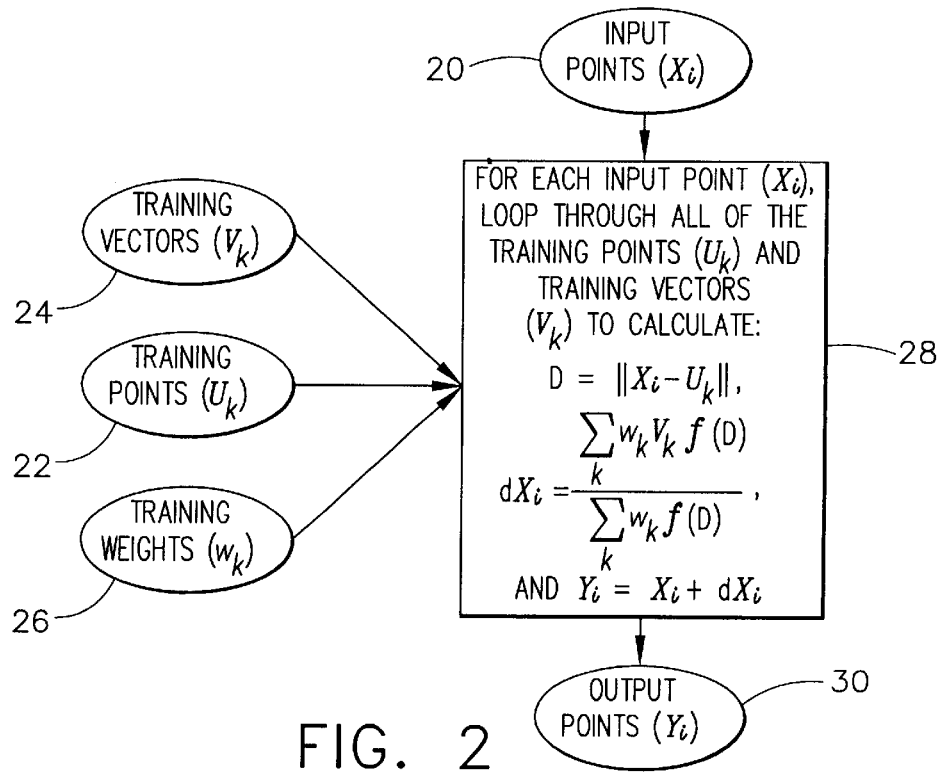
FIG. 2 is a flow chart similar to that of FIG. 1, except that training point weights are used.

FIG. 2 is another flow chart showing the steps of the method of the present invention starting with a set of input points $X_i$ at the reference numeral 20. FIG. 2 also contains a set of training points $U_k$ at 22, training vectors $V_k$ at 24, and a set of "training weights" $w_k$ at the reference numeral 26. As can be seen in Table #2 and Table #4 hereinbelow, each training point has an associated training vector and training weight. Since certain training points can be more heavily weighted than others, these particular training points with heavier weights will have a more pronounced effect on the nearby input points as these points are transformed into corresponding output points.

Figure 16:
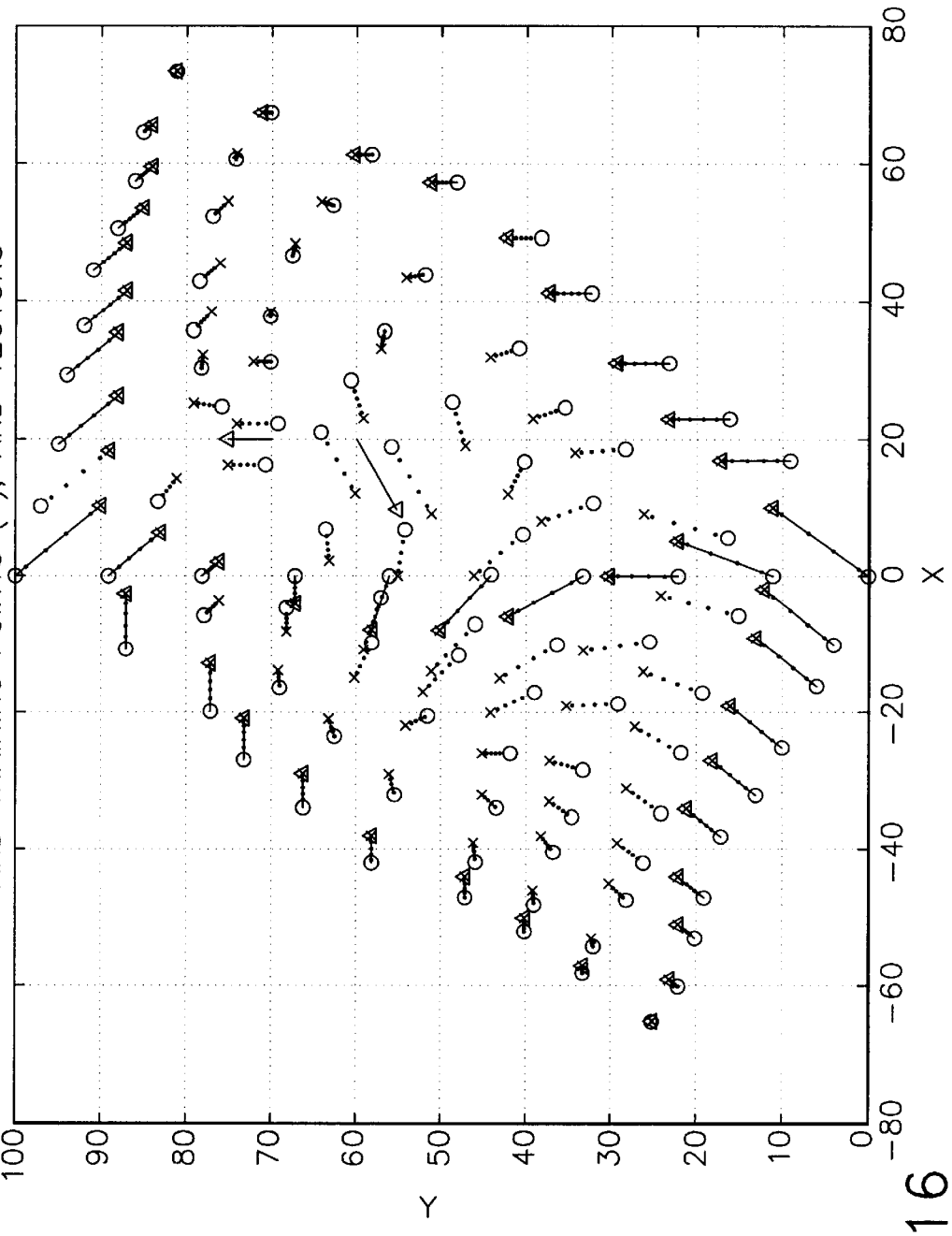
FIG. 16 is a graph showing the input points, output points, intermediate points, training points, and training vectors for Example 2.

On FIG. 2, the set of output points $Y_i$ is designated at the reference numeral 30. A function block 28 is virtually identical to the function block 16 on FIG. 1, however, the equation for the transformation vector $dX_i$ now includes the weighting factors $w_k$. As explained above, these weighting factors are part of the general form shown in Equation #2, depicted above. The effect of weighting certain of the training points is best illustrated by viewing the examples provided herein, in which Example 1 uses a training weight of one (1) for most of its training points, and a training weight of two (2) for others of the training points. This example will be discussed in greater detail below, but for now the reader's attention is directed on FIG. 11 to the input points in the area between the X-values between 0 and 60, and Y-values between 50 and 90. This should be compared to FIG. 16, in which (as part of Example 2) two additional training points are introduced having a greater weighting factor of four (4). The affect of these two additional training points is rather dramatic upon the input points in the area specified above, and it can be seen that the displacement between these input points and their corresponding output points in the area between the X-values of 0 to 40 and Y-values between 50 and 80 not only change in magnitude, but also in direction.

Figure 3:
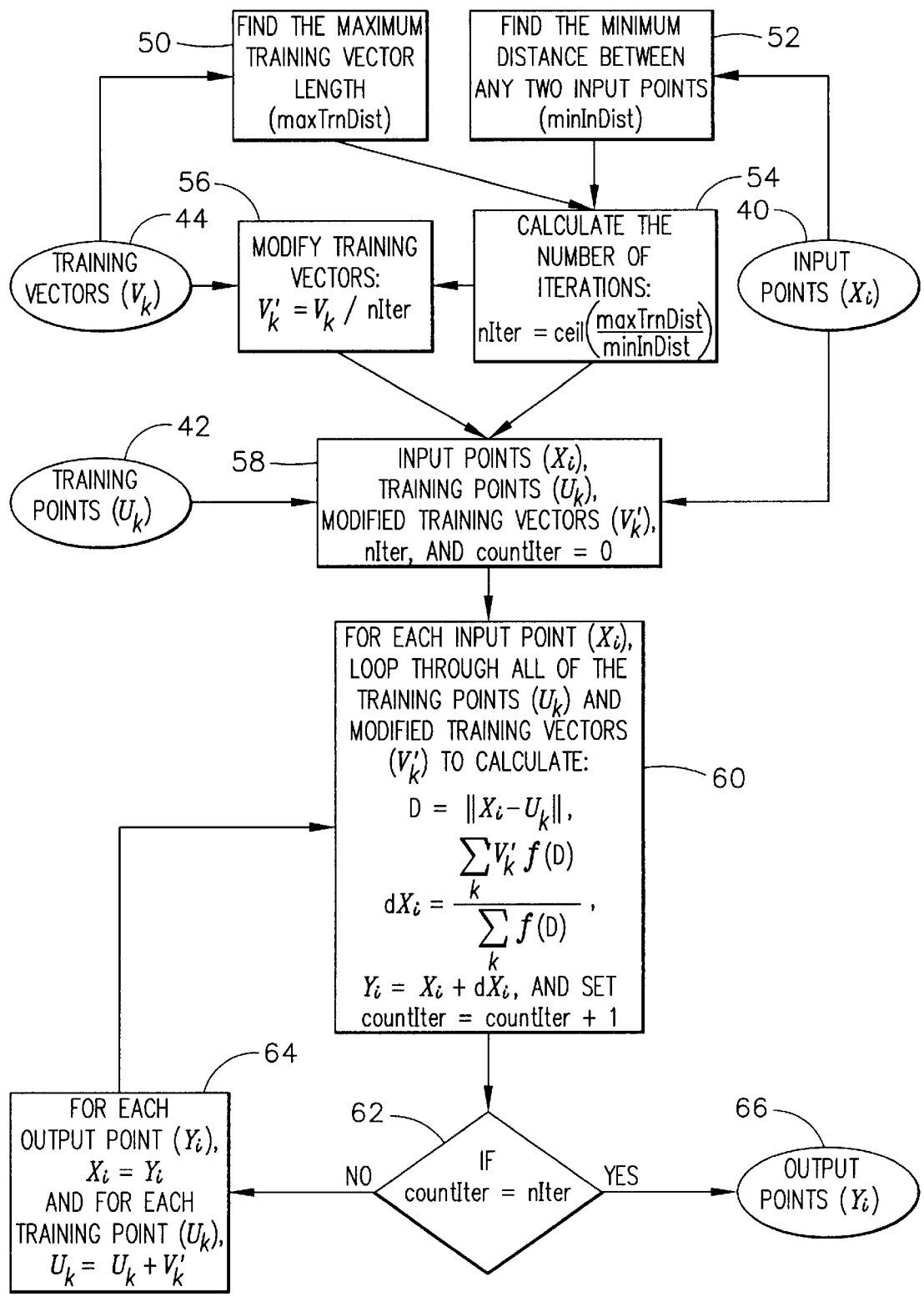
FIG. 3 is a flow chart of the scattered data transformation method of the present invention in which iterations are used to refine the movements throughout the color space of the input points.

Before discussing the flow chart of FIG. 3, it should be noted when the magnitudes of any training vectors $V_k$ are larger than the distances between any neighboring input points $X_i$, then the transform described above can produce a result that may not be smooth. In this situation, for input points that are relatively close to the initial training point locations but that are relatively far from the ending locations of these training points due to their respective training vectors, such input points will be more affected than other input points that are relatively near to portions of this particular training vector, but were not very close to the initial training point positions. A simple refinement solves this problem.

The training vectors $V_k$ are scaled and broken into a set of equally-spaced vectors, and the affect of each segment is calculated upon the nearby input points by iterating the transform for each of these equally-spaced segments until the training points reach their desired destination at $U_k+V_k$. The number of iterations "t" is given by the Equation #6, immediately following:

$$t = ceil\left(\frac{\max(\|V_k\|)}{\min(\|X_i - X_{j+1}\|)}\right) \qquad \text{EQUATION \#6}$$

In Equation #6, the "ceil" operator rounds its argument up to the next integer. The numerator of Equation #6 is the maximum magnitude of all displacement vectors $V_k$ of the entire set of such displacement vectors (i.e., the set 44 on FIG. 3), and the denominator is the minimum distance between all of the input points $X_i$ of the entire set of input points (i.e., set 40 on FIG. 3).

In this situation, new variable names are used for these iterative variables that will be used in the transformation equations. The training vectors will now be described as "modified training vectors," and the equation for these modified training vectors is given below as Equation #7:

$$V'_k = \frac{V_k}{t} \qquad \text{EQUATION \#7}$$

These modified training vectors $V'_k$ are the new displacement vectors used in each of the iterations. The initial training points are now denoted by the variable name $U_{i,1}$, and the new initial input points are denoted by the variable name $X_{i,1}$. Furthermore, the following notation will be used for other iterative variables as follows: $U_{i,j}$, are the training points used in the $j^{th}$ iteration, $X_{i,j}$, are the input points used in the $j^{th}$ iteration, and $Y_{i,j}$ are the output points resulting from the $j^{th}$ iteration, where j=1, ..., t.

The following equations number 8 and 9 have the following values:

$$U_{i,1}=U_i \qquad \text{EQUATION \#8}$$

$$X_{i,1}=X_i \qquad \text{EQUATION \#9}$$

The scattered data transformation equations using iterations now become as follows:

$$Y_{i,j}=X_{i,j}+dX_{i,j}(i=1,\ldots N; j=1,\ldots,t) \qquad \text{EQUATION \#10}$$

$$dX_{i,j} = \frac{\sum_{k=1}^{M} w_k \cdot V'_k \cdot f(D_{ik})}{\sum_{k=1}^{M} w_k \cdot f(D_{ik})} \qquad \text{EQUATION \#11}$$

$$D_{ik}=\|X_{i,j}-U_{k,j}\| \qquad \text{EQUATION \#12}$$

$$X_{i,j+1}=Y_{i,j} \qquad \text{EQUATION \#13}$$

$$U_{k,j+1}=U_{k,j}+V_k \qquad \text{EQUATION \#14}$$

The output of the $j^{th}$ iteration is the input to the $(j+1)^{th}$ iteration (see Equation #13), and the training points are moved along by the vectors $V'_k$ after each iteration (see Equation #14). These new equations describe a method of transformation from input color space to output color space that has all of the properties listed above for the earlier-described non-iterative scattered data transformation of the present invention.

The flow chart depicted on FIG. 3 depicts a scattered data transformation method that uses the iterations described above, although in this particular example there are no training point weights (or, more accurately, all training point weights are set=1). The flow chart begins with a set of input points $X_i$ designated by the reference numeral 40, a set of training points $U_k$ at 42, and a set of training vectors $V_k$ at 44. The first functional operation on FIG. 3 is at a step 50 which determines the maximum training vector length by inspecting each of the training vectors $V_k$ of the set 44, determining their scalar magnitudes in n-dimensional input color space, and selecting the one having the maximum length. This value is assigned to a variable named "maxTrnDist."

Using the input point data, a step 52 finds the minimum distance between any two of the input points $X_i$ from the set 40, by inspecting the coordinates of all these input points in the n-dimensional input color space. While the actual distance is a scalar quantity, this calculation uses the vector lengths between each of the adjacent input points, and finds that vector having the minimum length of this set of vectors. This scalar value is assigned to a variable named "minInDist."

Using the information from steps 50 and 52, a step 54 calculates the number of iterations that preferably should be performed for the scattered data transformation of the present invention. On FIG. 3, the number of iterations is given the variable name "nIter" and has the value of the result of the variable "maxTrnDist" divided by "minInDist." In the preferred embodiment, this value is rounded up to the nearest integer, as seen by inspecting Equation #6.

Now that the number of iterations is known, a step 56 modifies the training vectors by taking the set 44 of training vectors $V_k$ and dividing this set by the number of iterations nIter. The result is given the variable name $V'_k$, and referred to as "modified training vectors."

A step 58 now prepares for the calculations needed to perform the scattered data transformation of the present invention. All of the important variables needed for these calculations are arranged in a matrix or table format, including the set of input points $X_i$, training points $U_k$, modified training vectors $V'_k$, and the number of iterations "nIter." Moreover, a counter variable named "countIter" is set to the value of zero (0).

A function block 60 now calculates, for each iteration, the values of the distance $D_{ik}$, the differential values $dX_i$, the values for the function of $D_{ik}$, and the values of the output points $Y_i$. After each iteration of these calculations, the counter variable countIter is incremented.

A decision step 62 now determines if the counter variable has reached its maximum iteration values (i.e., when the value of the variable countIter is equal to the variable nIter), and if the answer is YES, the final set 66 of output points $Y_i$ has been created. On the other hand, if all of the iterations have not yet been performed, the answer at decision step 62 will be NO, and a step 64 will then be executed.

At step 64, for each output point $Y_i$ the intermediate input points $X_i$ are set equal to the intermediate value of $Y_i$. Furthermore, for each of the training points $U_k$, the iterative training point position will be modified by the value of the modified training vector $V'_k$. This is done by a vector addition using the equation $U_k = U_k + V'_k$, which is very similar to the Equation #14, provided above.

After step 64 is executed, the functions of step 60 are again performed for each of the input points $X_i$, and all the calculations will be made by looping through all the training points $U_k$ and modified training vectors $V'_k$. This logic loop between steps 60, 62, and 64 will continue to be iterated until the iteration counter has reached the total number of iterations that are to be performed (as provided by the iteration variable nIter).

Figure 4:
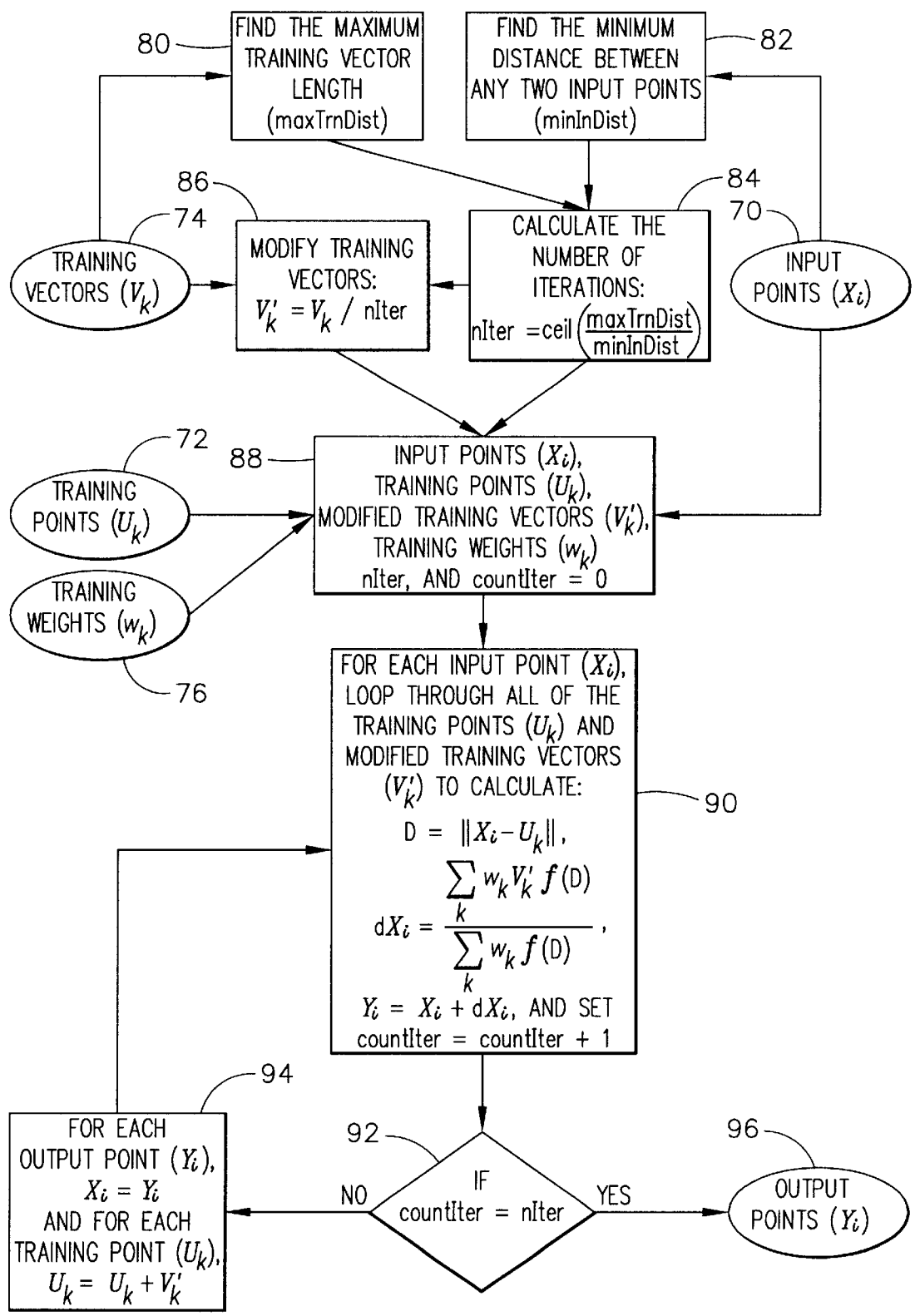
FIG. 4 is a flow chart similar to that of FIG. 3, except that training point weights are also considered in the calculations.

FIG. 4 depicts a flow chart of the scattered data transformation of the present invention in which iterations are performed on the training vectors and all the calculations for the input points and output points, and further in which training point weights are assigned and included in these calculations. The variable names for the iteration variables and modified training vectors are identical to those discussed in conjunction with the flow chart of FIG. 3. All of the other variable names are identical except for the addition of the set of training weights $w_k$ at the reference numeral 76. Moreover, the equation in function block 90 that calculates the incremental value added to the input points $dX_i$ is now modified to include the training weights variable $w_k$. The equation shown for this calculation on FIG. 4 is very similar to that depicted in Equation #2, but now has the form shown in Equation #11, which uses the modified training vectors $V'_k$.

The set of beginning input points is given at 70, the set of initial training points at 72, the set of training vectors at 74, and the set of training weights at 76. A function block 80 finds the maximum training vector length, and a function block 82 finds the minimum distance between any two input points. The number of iterations are calculated at a step 84, and the training vectors are modified at a step 86. The function block 88 gathers all the necessary variables and sets the iteration counter to zero (0).

A function block 90 performs all the calculations described above by looping through all of the training points and modified training vectors for each of the input points $X_i$. The result of the calculations performed in function block 90 is a set of incremental output points $Y_i$, and in addition the iteration counter is incremented.

As in FIG. 3, the iteration counter is inspected at a decision step 92 to determine if all the iterations have been performed. If the answer is YES, then the final set of output points $Y_i$ is made available at 96. If the answer is NO, then a step 94 is executed which sets the next iterative values for the input points $X_i$ and for each of the training points $U_k$. The logic loop formed by steps 90, 92, and 94 is iteratively performed until all of the iterations have been completed.

Figure 7:
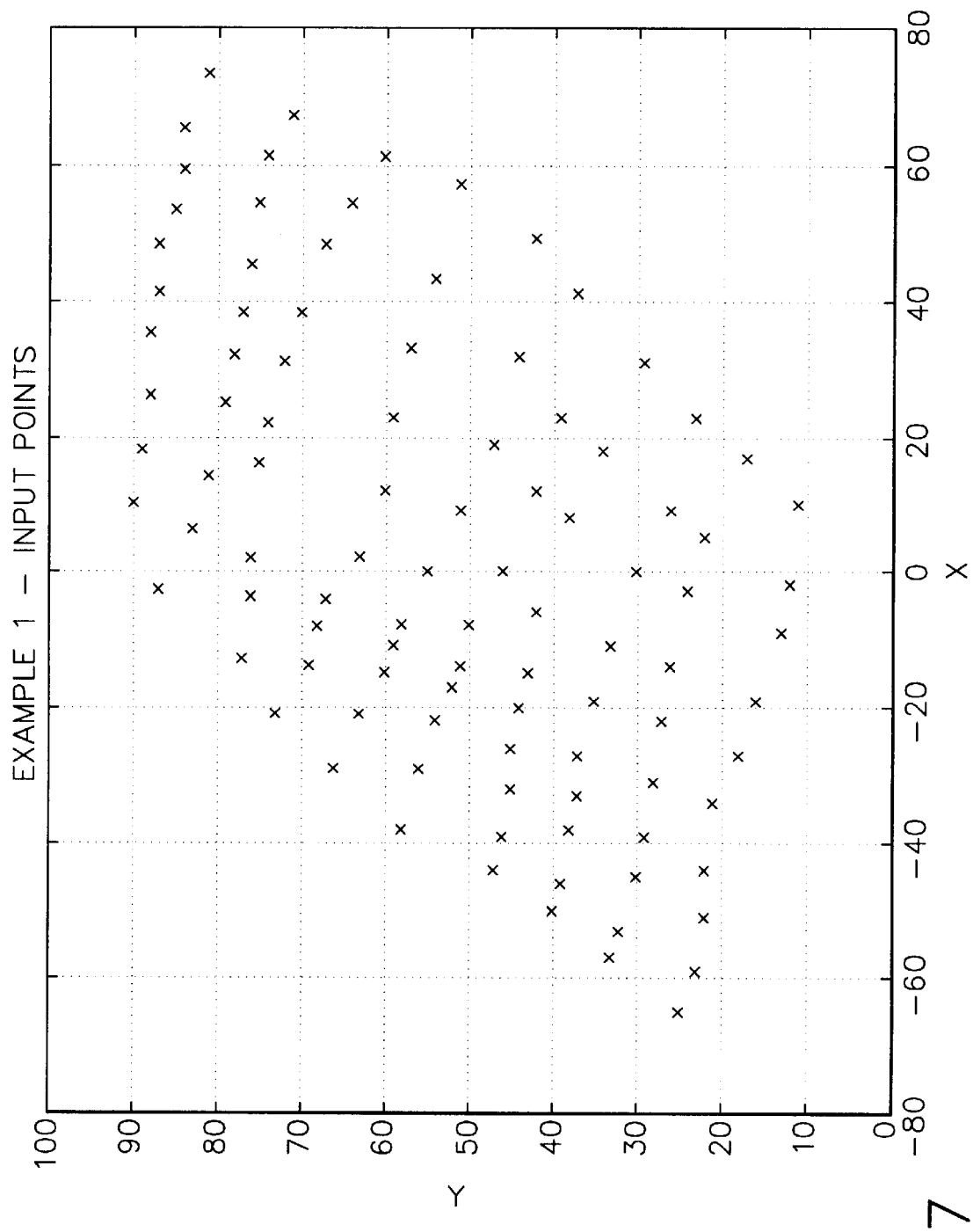
FIG. 7 is a graph of the input points used in an Example 1 with respect to the flow chart of FIG. 4.

A few examples are provided below to help illustrate the beneficial effects of using the scattered data transformation method of the present invention. Again, two-dimensional examples are provided to simplify visualization. An Example 1 is depicted on FIGS. 7–11, in which FIG. 7 shows the set of input points $X_i$ selected in this example. The X- and Y-coordinates of the input points are provided in a Table #1 following immediately below:

TABLE #1

EXAMPLE 1 - Input Points

| x | y | x | y | x | y | x | y |
|---|---|---|---|---|---|---|---|
| 10 | 90 | 31 | 72 | −38 | 58 | −19 | 35 |
| 18 | 89 | 38 | 70 | −29 | 56 | −11 | 33 |
| 26 | 88 | 48 | 67 | −22 | 54 | 0 | 30 |
| 35 | 88 | 54 | 64 | −17 | 52 | 9 | 26 |
| 41 | 87 | 61 | 60 | −14 | 51 | 23 | 23 |
| 48 | 87 | −21 | 73 | −8 | 50 | −57 | 33 |
| 53 | 85 | −14 | 69 | 0 | 46 | −53 | 32 |
| 59 | 84 | −8 | 68 | 12 | 42 | −45 | 30 |
| 65 | 84 | −4 | 67 | 23 | 39 | −39 | 29 |
| 73 | 81 | 2 | 63 | 41 | 37 | −31 | 28 |
| −3 | 87 | 12 | 60 | −44 | 47 | −22 | 27 |
| 6 | 83 | 23 | 59 | −39 | 46 | −14 | 26 |
| 14 | 81 | 33 | 57 | −32 | 45 | −3 | 24 |
| 25 | 79 | 43 | 54 | −26 | 45 | 5 | 22 |
| 32 | 78 | 57 | 51 | −20 | 44 | 17 | 17 |
| 38 | 77 | −29 | 66 | −15 | 43 | −65 | 25 |
| 45 | 76 | −21 | 63 | −6 | 42 | −59 | 23 |
| 54 | 75 | −15 | 60 | 8 | 38 | −51 | 22 |
| 61 | 74 | −11 | 59 | 18 | 34 | −44 | 22 |
| 67 | 71 | −8 | 58 | 31 | 29 | −34 | 21 |
| −13 | 77 | 0 | 55 | −50 | 40 | −27 | 18 |
| −4 | 76 | 9 | 51 | −46 | 39 | −19 | 16 |
| 2 | 76 | 19 | 47 | −38 | 38 | −9 | 13 |
| 16 | 75 | 32 | 44 | −33 | 37 | −2 | 12 |
| 22 | 74 | 49 | 42 | −27 | 37 | 10 | 11 |

It will be understood that the number of input points in the input color space and the coordinates of these input points is entirely selectable by the color systems engineer for a particular application, such as for a color printer or a color video monitor. In a real-life application, the number of input points would likely be much greater, even perhaps several thousand.

The examples provided herein are depicted as two-dimensional examples which roughly correspond to an L*a*b* chart for a particular hue (i.e., L* vs. C*, where C* is called the "chroma", which is dependent upon the magnitude of a* and b*). As related above, L*a*b* charts are used as a uniform color space expression of color for many various types of printing and displaying devices throughout the industry. Other color coordinate systems could be used with the present invention (e.g., CMY, CMYK, RGB, L*u*v*, xyz, . . . ), although it is preferred that the L*a*b* system be used. Moreover, as discussed above, the present invention is certainly is not restricted to any particular number of dimensions for color space, particularly since the equations are generalized for n-dimensional color space.

Figure 8:
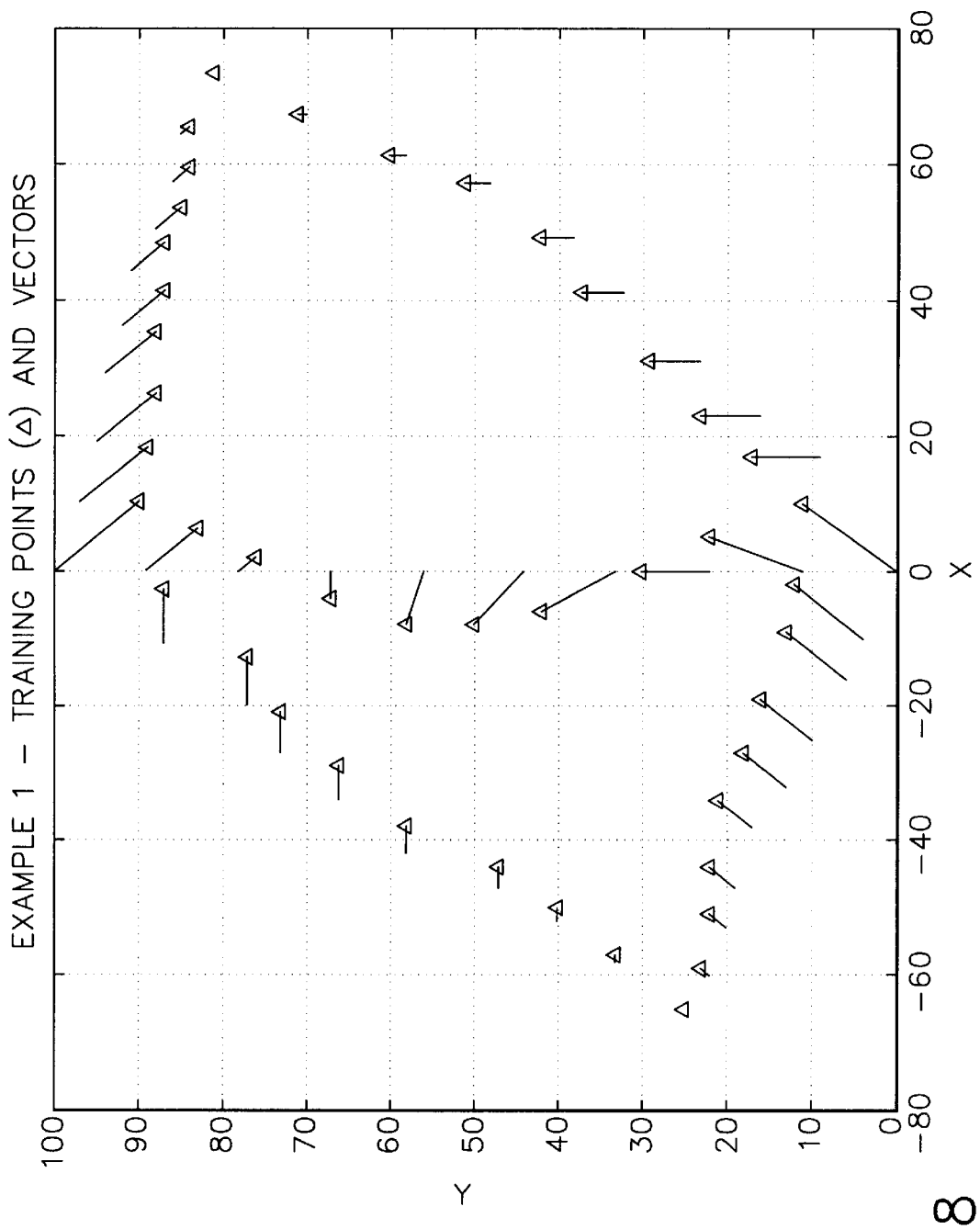
FIG. 8 is a graph of the training points and vectors used in Example 1.

Each of the input points on FIG. 7 is depicted by a small letter "x". FIG. 8 shows a set of training points and training vectors, in which the training points are depicted by a triangular symbol, and the vectors are depicted by a two-dimensional line that extends from each of the training point triangular symbols. The exact training point coordinates and training vector quantities are given in a Table #2, immediately below:

TABLE #2

EXAMPLE 1-Training Points

| Training Points | | Training Vectors | | Training Weights | Training Points | | Training Vectors | | Training Weights |
|---|---|---|---|---|---|---|---|---|---|
| x | y | x | y | w | x | y | x | y | w |
| 10 | 90 | −10 | 10 | 2 | 61 | 60 | 0 | −2 | 1 |
| 6 | 83 | −6 | 6 | 2 | −21 | 73 | −6 | 0 | 1 |
| 2 | 76 | −2 | 2 | 2 | 57 | 51 | 0 | −3 | 1 |
| −4 | 67 | 4 | 0 | 2 | −29 | 66 | −5 | 0 | 1 |
| −8 | 58 | 8 | −2 | 2 | 49 | 42 | 0 | −4 | 1 |
| −8 | 50 | 8 | −6 | 2 | −38 | 58 | −4 | 0 | 1 |
| −6 | 42 | 6 | −9 | 2 | 41 | 37 | 0 | −5 | 1 |
| 0 | 30 | 0 | −8 | 2 | −44 | 47 | −3 | 0 | 1 |
| 5 | 22 | −5 | −11 | 2 | 31 | 29 | 0 | −6 | 1 |
| 10 | 11 | −10 | −11 | 2 | −50 | 40 | −2 | 0 | 1 |
| 18 | 89 | −8 | 8 | 1 | 23 | 23 | 0 | −7 | 1 |
| 26 | 88 | −7 | 7 | 1 | −57 | 33 | −1 | 0 | 1 |
| 35 | 88 | −6 | 6 | 1 | 17 | 17 | 0 | −8 | 1 |
| 41 | 87 | −5 | 5 | 1 | −65 | 25 | 0 | 0 | 1 |
| 48 | 87 | −4 | 4 | 1 | −59 | 23 | −1 | −1 | 1 |
| 53 | 85 | −3 | 3 | 1 | −51 | 22 | −2 | −2 | 1 |
| 59 | 84 | −2 | 2 | 1 | −44 | 22 | −3 | −3 | 1 |
| 65 | 84 | −1 | 1 | 1 | −34 | 21 | −4 | −4 | 1 |
| 73 | 81 | 0 | 0 | 1 | −27 | 18 | −5 | −5 | 1 |
| −3 | 87 | −8 | 0 | 1 | −19 | 16 | −6 | −6 | 1 |
| 67 | 71 | 0 | −1 | 1 | −9 | 13 | −7 | −7 | 1 |
| −13 | 77 | −7 | 0 | 1 | −2 | 12 | −8 | −8 | 1 |

Figure 9:
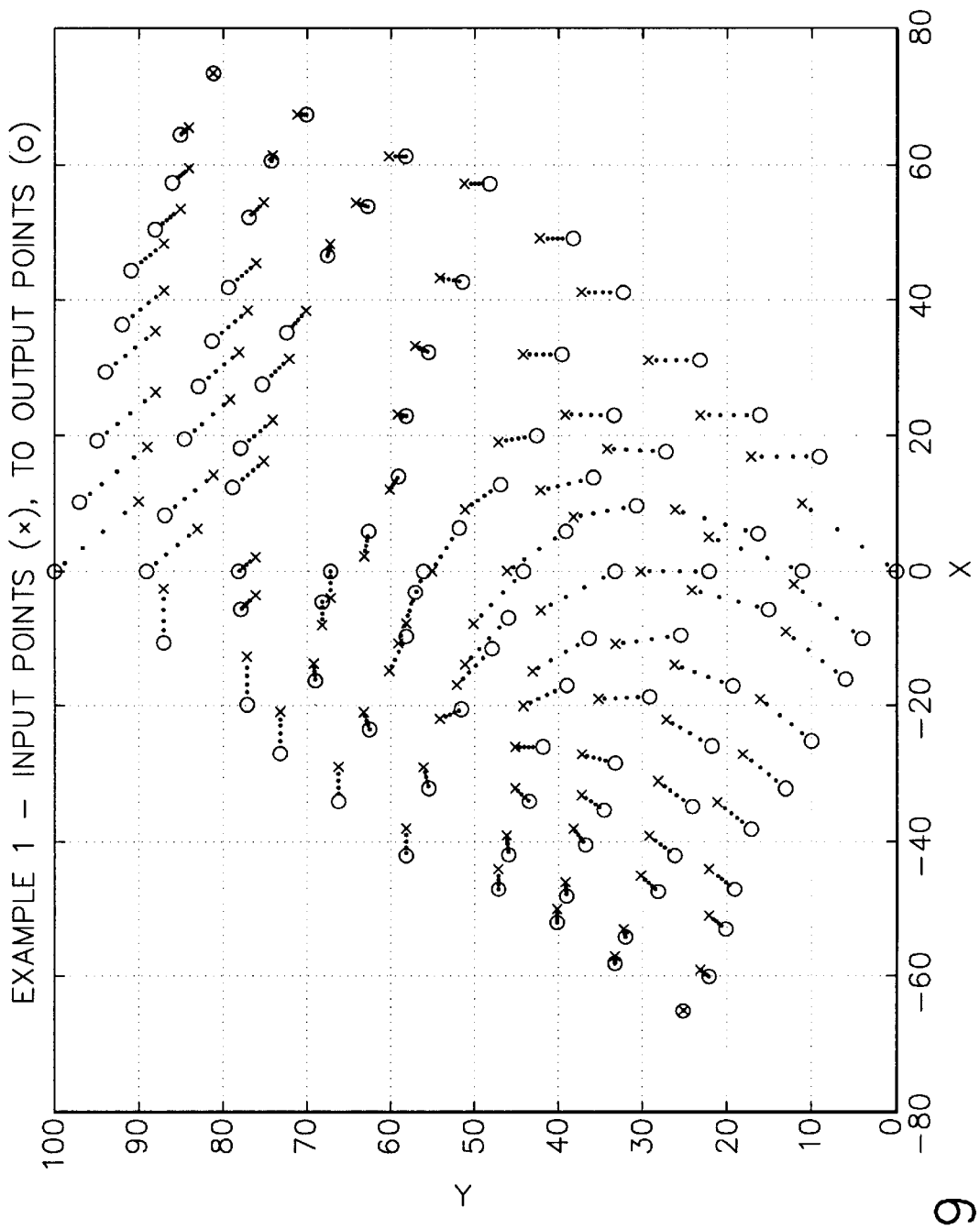
FIG. 9 is a graph showing the input points and output points, and their respective intermediate points, for Example 1.

Table #2 also contains the training weights $w_k$, and it can be seen that there is an individual training weight assigned to each of the training points. FIG. 9 shows the movements of the input points "x" as they migrate to their output point positions, which are depicted by circular symbols on FIG. 9. The dotted lines that extend from each input point to each respective output point represent the intermediate positions of the input points after each iteration of the present invention, as according to the flow chart of FIG. 4. In this example, five iterations were required.

As can be seen by inspecting FIG. 9, many of the input points move quite a distance before arriving at their respective output points. By comparing FIG. 9 to FIG. 8, it will be seen that the locations of those input points that move the greatest distance are those input points in close proximity to training points that are associated with relatively long training vectors. Furthermore, it can also be seen that many of the input points move only a slight amount, or not at all. For example, the most left-hand input point and the most right-hand point do not move at all. In this Example 1, these two non-moving input points exactly correspond to two training points that also do not move (i.e., their training vectors have a zero magnitude). This shows the flexibility of the method of the present invention, since an input point that exactly corresponds to a training point will also have its respective output point exactly correspond to the ending position of the training vector for that associated training point.

Figure 10:
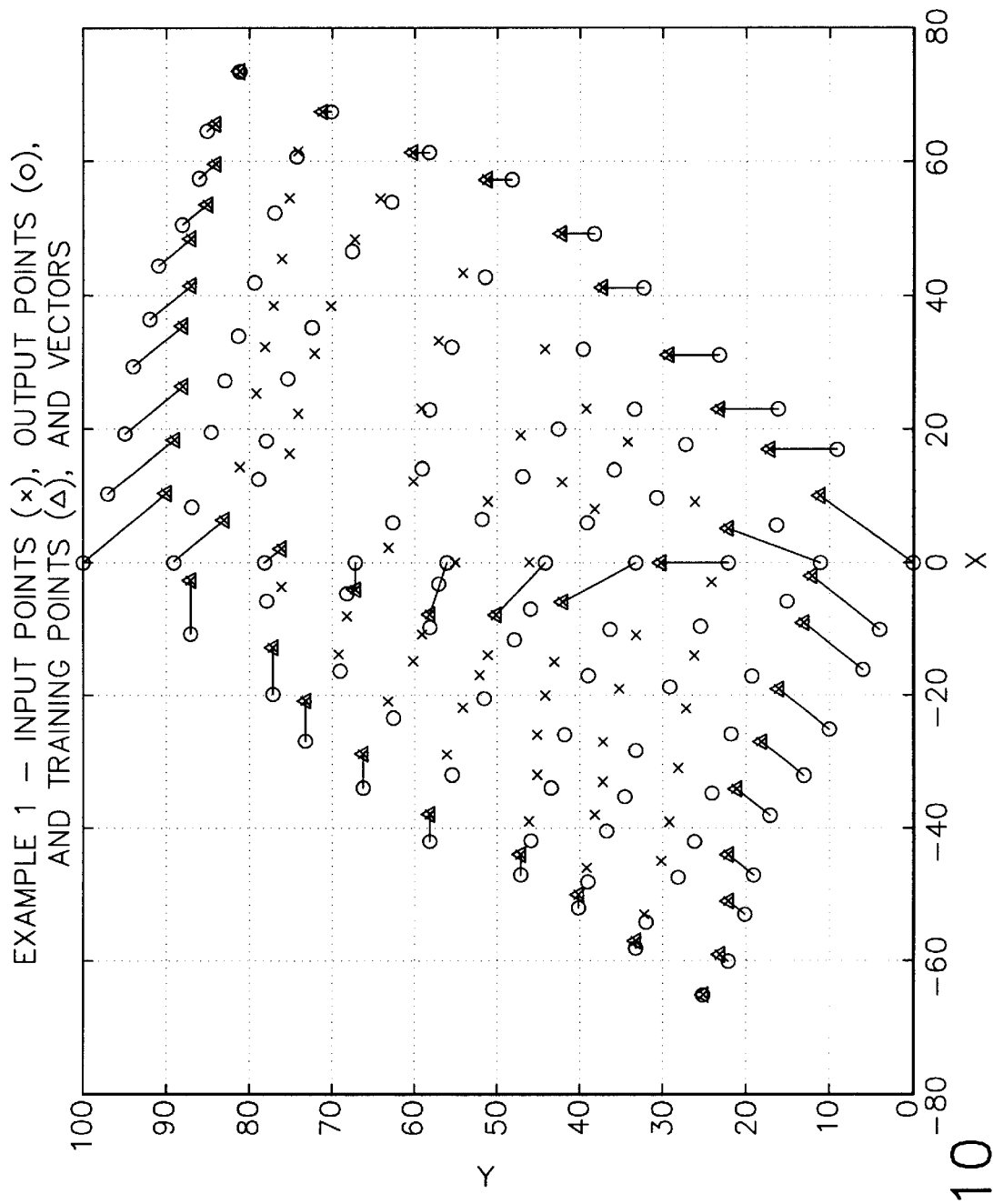
FIG. 10 is a graph of the input points, output points, training points, and training vectors for Example 1.
Figure 11:
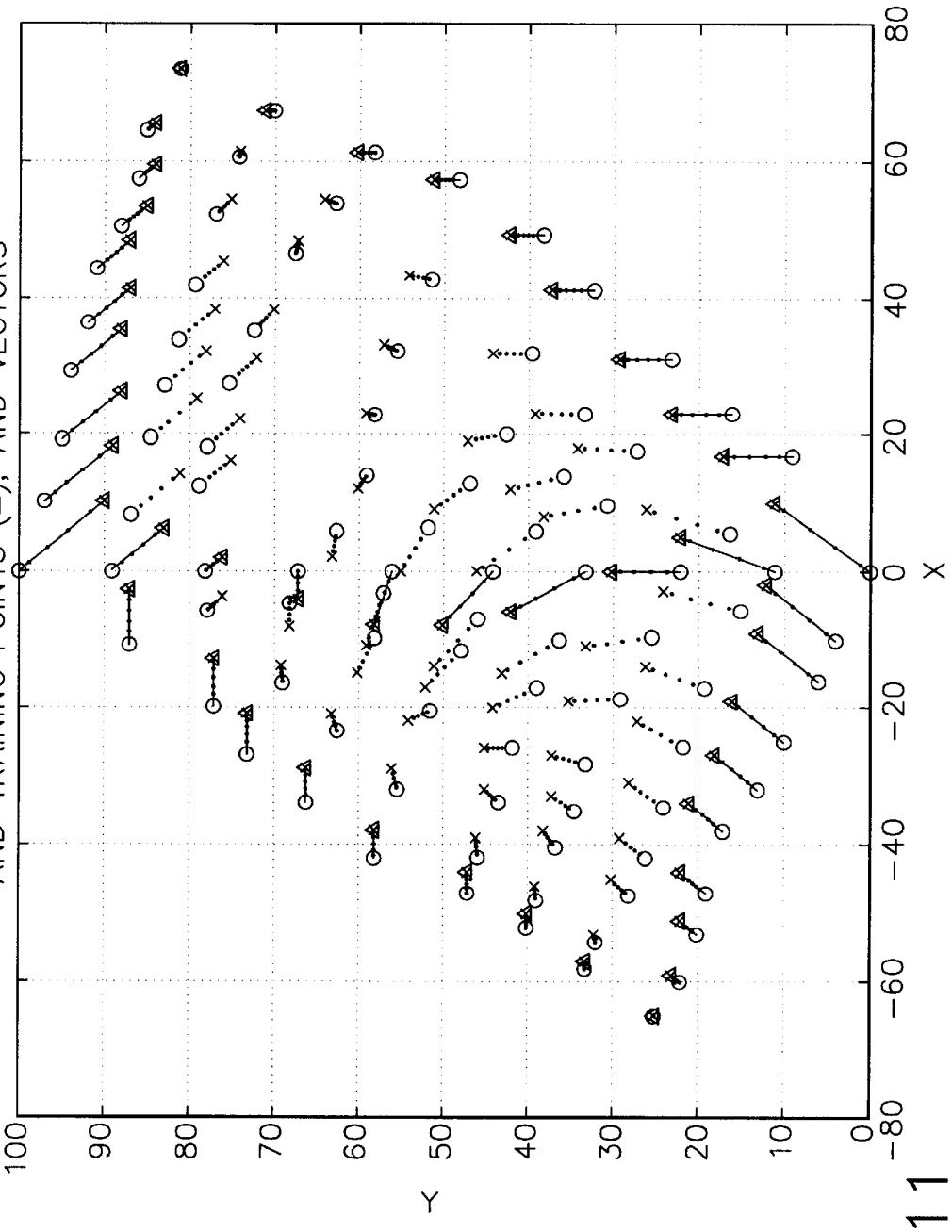
FIG. 11 is a graph showing the input points, output points, intermediate points, training points, and training vectors for Example 1.

FIG. 10 shows all of the input points, output points, training points, and training vectors on a single graph. While this information on a single graph is illustrative, the chart of FIG. 11 provides even greater information because it not only shows the same information as on FIG. 10, but also shows the intermediate points in dotted lines. These intermediate points show the corresponding movements of each input point and its respective output point, and also show the effect of the scattered data transformation of the present invention on input points that are not training points, due to nearby training points.

Example 1 includes 100 input points and 44 training points. In this example, all of the training points also happened to be input points. The training points include all of the input points around the outside edge of the color gamut, and also some of the input points that go through the middle of the graph. The training points and training vectors were chosen to move the outer input points somewhat away from the center of the graph, and to move the middle input points so that they are more evenly spaced along the x=0 axis. The middle training points are deemed to have more importance, and so are given a training weight of two (2) while the rest of the training points are given a training weight of one (1).

Figure 12:
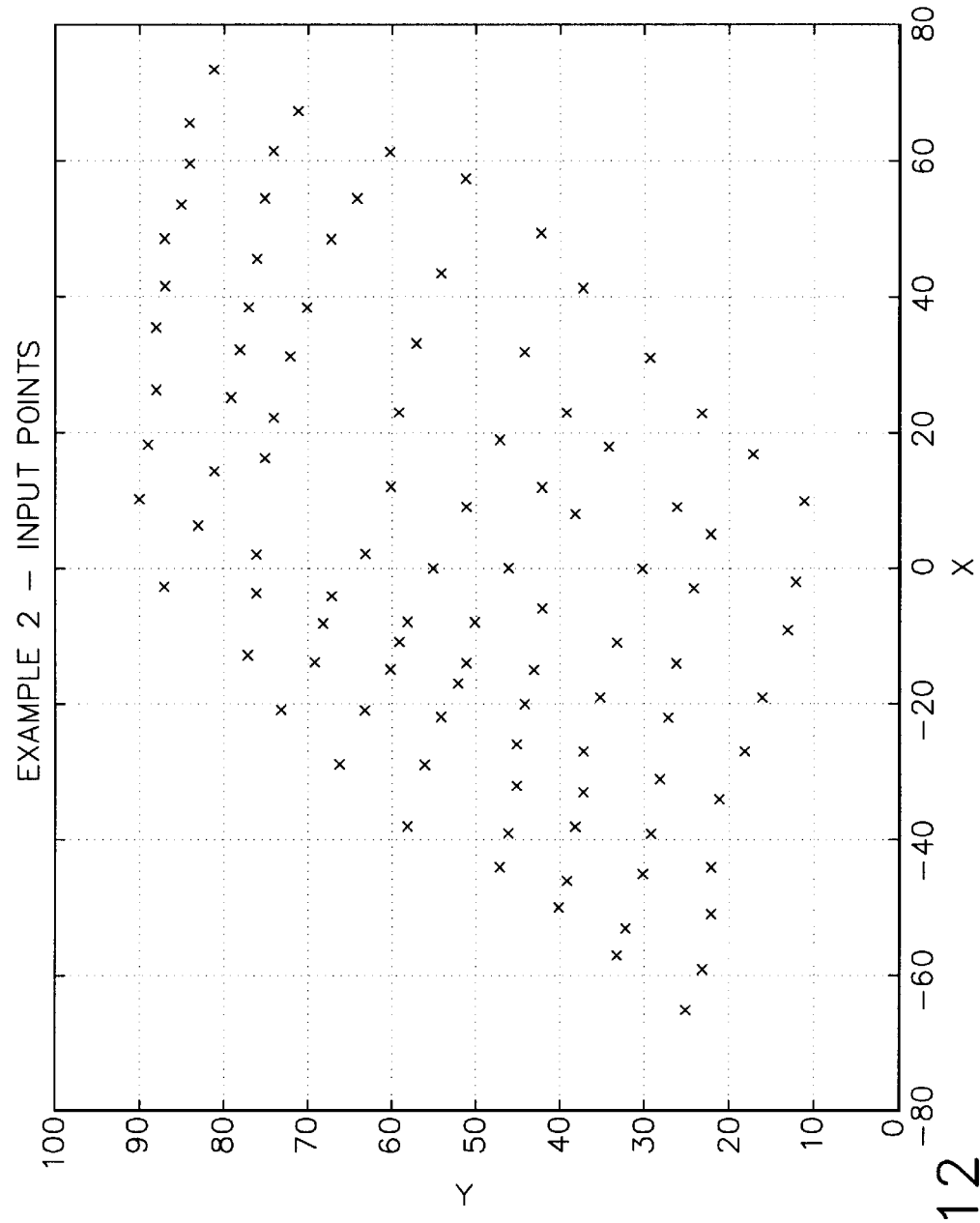
FIG. 12 is a graph of the input points used in an Example 2 with respect to the flow chart of FIG. 4.
Figure 13:
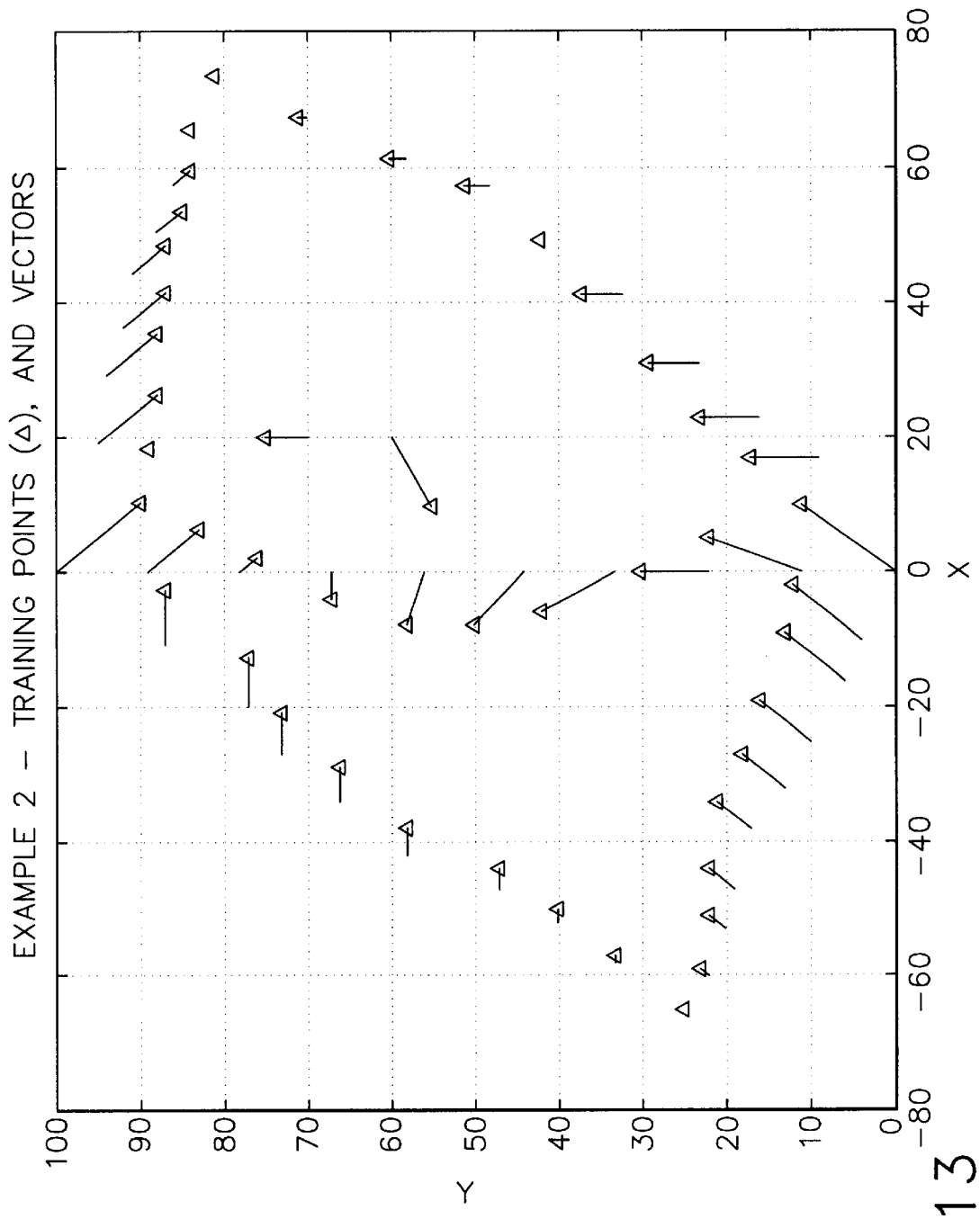
FIG. 13 is a graph of the training points and vectors used in Example 2.
Figure 14:
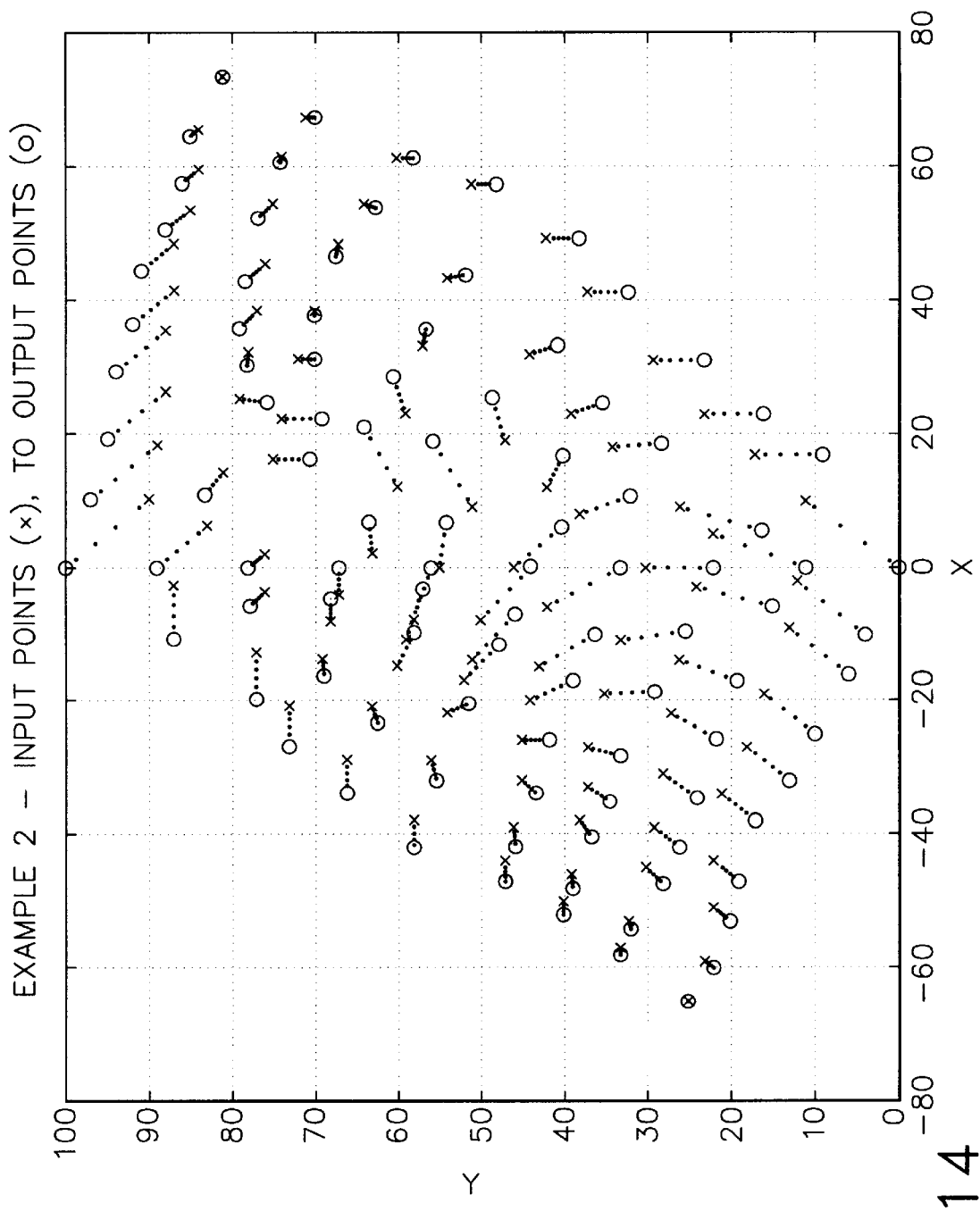
FIG. 14 is a graph showing the input points and output points, and their respective intermediate points for Example 2.

In Example 2, the same set of input points is used, however, two additional training points are added. In this example, the two additional training points are not input points. They are being added to close a "gap" in the input points and are given a training weight of four (4). FIG. 12 shows the set of input points, designated by the letter "x". As would be expected, FIG. 12 is virtually identical to FIG. 7. FIG. 13 shows the training points and the training vectors, which are identical to those depicted on FIG. 8 except for the two additional training points and vectors shown in the middle of the diagram between the X-values of 10–20. FIG. 14 shows the input points and their corresponding output points on a single graph, in which the dotted lines show the intermediate positions of the movements of these input points.

Figure 15:
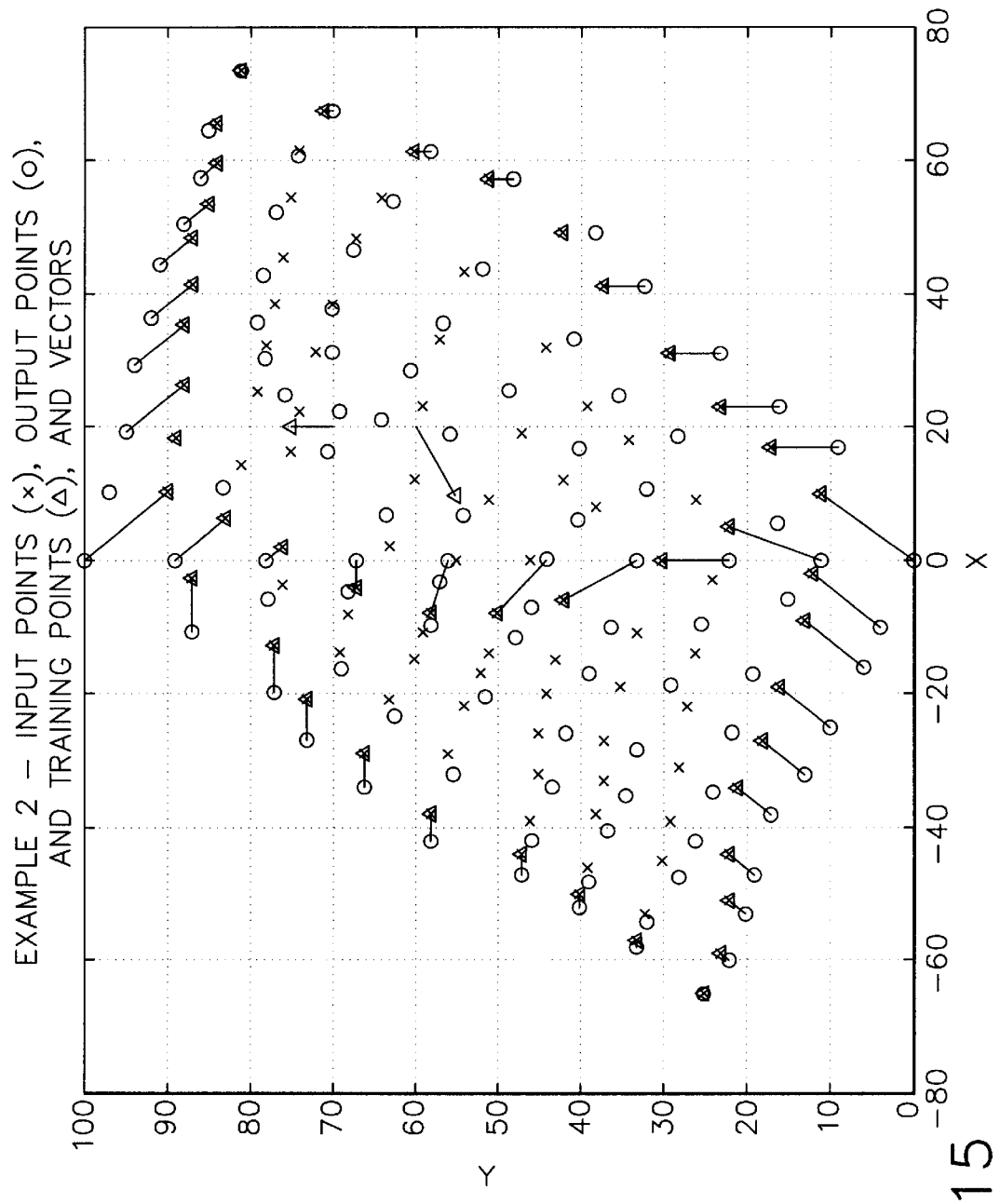
FIG. 15 is a graph of the input points, output points, training points, and training vectors for Example 2.

FIG. 15 shows the input points, output points, training points, and training vectors on a single graph. More informative is FIG. 16, which shows the same information, but also illustrates the intermediate points showing the movements of the input points as they migrate toward their output point positions. As can be seen by inspecting FIG. 16, the input points located near the two additional training points and vectors are affected in a quite different manner than those shown in Example 1 (see FIG. 11 for a comparison). This will especially be true since these two additional training points were given a training weight of four (4).

The values of the input points for this Example 2 is provided in Table #3, immediately following below:

TABLE #3

EXAMPLE 2 - Input Points

| x | y | x | y | x | y | x | y |
|---|---|---|---|---|---|---|---|
| 10 | 90 | 31 | 72 | −38 | 58 | −19 | 35 |
| 18 | 89 | 38 | 70 | −29 | 56 | −11 | 33 |

TABLE #3-continued

EXAMPLE 2 - Input Points

| x | y | x | y | x | y | x | y |
|---|---|---|---|---|---|---|---|
| 26 | 88 | 48 | 67 | −22 | 54 | 0 | 30 |
| 35 | 88 | 54 | 64 | −17 | 52 | 9 | 26 |
| 41 | 87 | 61 | 60 | −14 | 51 | 23 | 23 |
| 48 | 87 | −21 | 73 | −8 | 50 | −57 | 33 |
| 53 | 85 | −14 | 69 | 0 | 46 | −53 | 32 |
| 59 | 84 | −8 | 68 | 12 | 42 | −45 | 30 |
| 65 | 84 | −4 | 67 | 23 | 39 | −39 | 29 |
| 73 | 81 | 2 | 63 | 41 | 37 | −31 | 28 |
| −3 | 87 | 12 | 60 | −44 | 47 | −22 | 27 |
| 6 | 83 | 23 | 59 | −39 | 46 | −14 | 26 |
| 14 | 81 | 33 | 57 | −32 | 45 | −3 | 24 |
| 25 | 79 | 43 | 54 | −26 | 45 | 5 | 22 |
| 32 | 78 | 57 | 51 | −20 | 44 | 17 | 17 |
| 38 | 77 | −29 | 66 | −15 | 43 | −65 | 25 |
| 45 | 76 | −21 | 63 | −6 | 42 | −59 | 23 |
| 54 | 75 | −15 | 60 | 8 | 38 | −51 | 22 |
| 61 | 74 | −11 | 59 | 18 | 34 | −44 | 22 |
| 67 | 71 | −8 | 58 | 31 | 29 | −34 | 21 |
| −13 | 77 | 0 | 55 | −50 | 40 | −27 | 18 |
| −4 | 76 | 9 | 51 | −46 | 39 | −19 | 16 |
| 2 | 76 | 19 | 47 | −38 | 38 | −9 | 13 |
| 16 | 75 | 32 | 44 | −33 | 37 | −2 | 12 |
| 22 | 74 | 49 | 42 | −27 | 37 | 10 | 11 |

The training points along with their respective training vectors and training weights are provided in a Table #4, immediately below:

TABLE #4

EXAMPLE 2-Training Points

| Training Points | | Training Vectors | | Training Weights | Training Points | | Training Vectors | | Training Weights |
|---|---|---|---|---|---|---|---|---|---|
| x | y | x | y | w | x | y | x | y | w |
| 10 | 90 | −10 | 10 | 2 | 61 | 60 | 0 | −2 | 1 |
| 6 | 83 | −6 | 6 | 2 | −21 | 73 | −6 | 0 | 1 |
| 2 | 76 | −2 | 2 | 2 | 57 | 51 | 0 | −3 | 1 |
| −4 | 67 | 4 | 0 | 2 | −29 | 66 | −5 | 0 | 1 |
| −8 | 58 | 8 | −2 | 2 | 49 | 42 | 0 | −4 | 1 |
| −8 | 50 | 8 | −6 | 2 | −38 | 58 | −4 | 0 | 1 |
| −6 | 42 | 6 | −9 | 2 | 41 | 37 | 0 | −5 | 1 |
| 0 | 30 | 0 | −8 | 2 | −44 | 47 | −3 | 0 | 1 |
| 5 | 22 | −5 | −11 | 2 | 31 | 29 | 0 | −6 | 1 |
| 10 | 11 | −10 | −11 | 2 | −50 | 40 | −2 | 0 | 1 |
| 18 | 89 | −8 | 8 | 1 | 23 | 23 | 0 | −7 | 1 |
| 26 | 88 | −7 | 7 | 1 | −57 | 33 | −1 | 0 | 1 |
| 35 | 88 | −6 | 6 | 1 | 17 | 17 | 0 | −8 | 1 |
| 41 | 87 | −5 | 5 | 1 | −65 | 25 | 0 | 0 | 1 |
| 48 | 87 | −4 | 4 | 1 | −59 | 23 | −1 | −1 | 1 |
| 53 | 85 | −3 | 3 | 1 | −51 | 22 | −2 | −2 | 1 |
| 59 | 84 | −2 | 2 | 1 | −44 | 22 | −3 | −3 | 1 |
| 65 | 84 | −1 | 1 | 1 | −34 | 21 | −4 | −4 | 1 |
| 73 | 81 | 0 | 0 | 1 | −27 | 18 | −5 | −5 | 1 |
| −3 | 87 | −8 | 0 | 1 | −19 | 16 | −6 | −6 | 1 |
| 67 | 71 | 0 | −1 | 1 | −9 | 13 | −7 | −7 | 1 |
| −13 | 77 | −7 | 0 | 1 | −2 | 12 | −8 | −8 | 1 |
| | | | | | 10 | 55 | 10 | 5 | 4 |
| | | | | | 20 | 75 | 0 | −5 | 4 |

Figure 17:
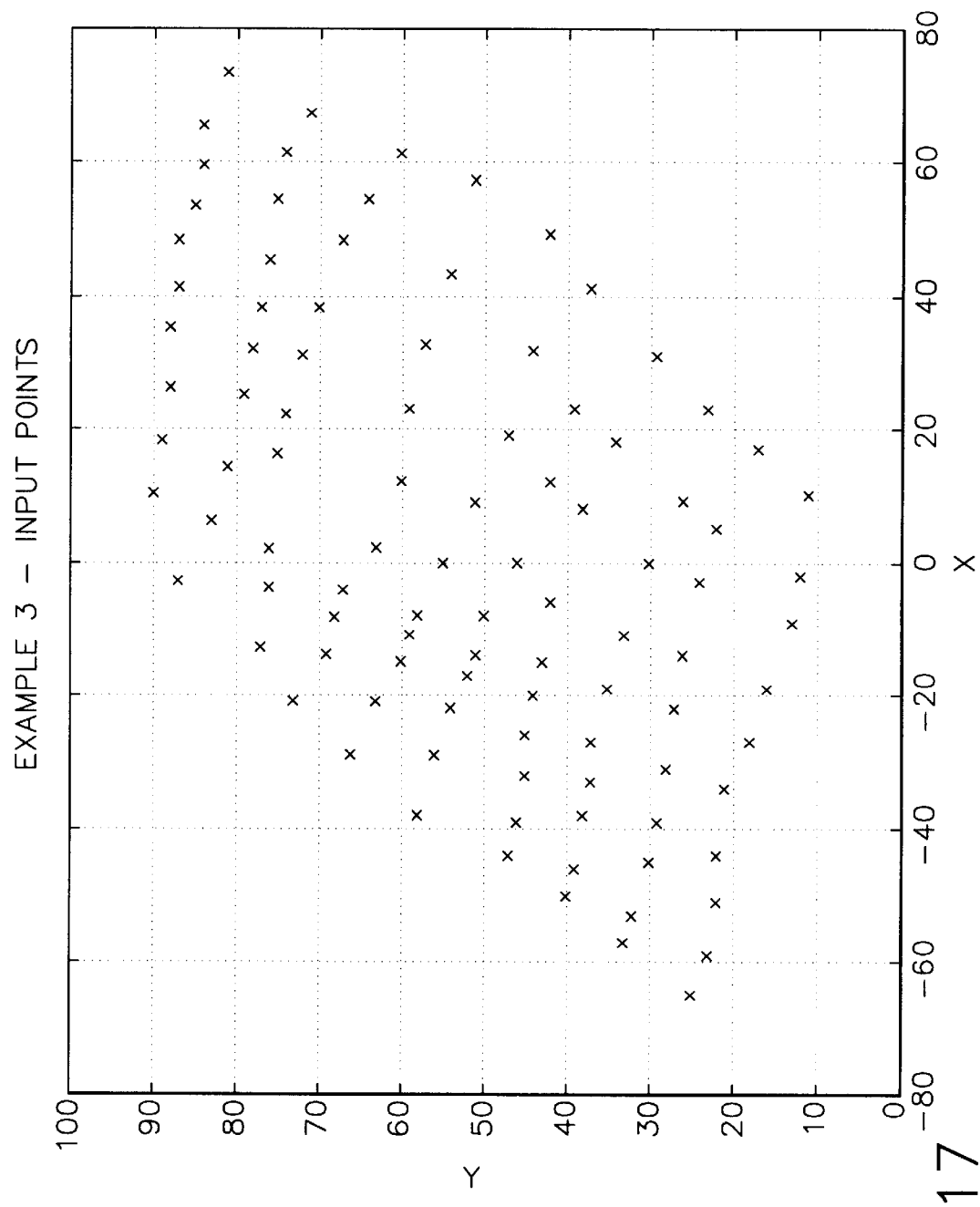
FIG. 17 is a graph of the input points used in an Example 3 with respect to the flow chart of FIG. 4.
Figure 18:
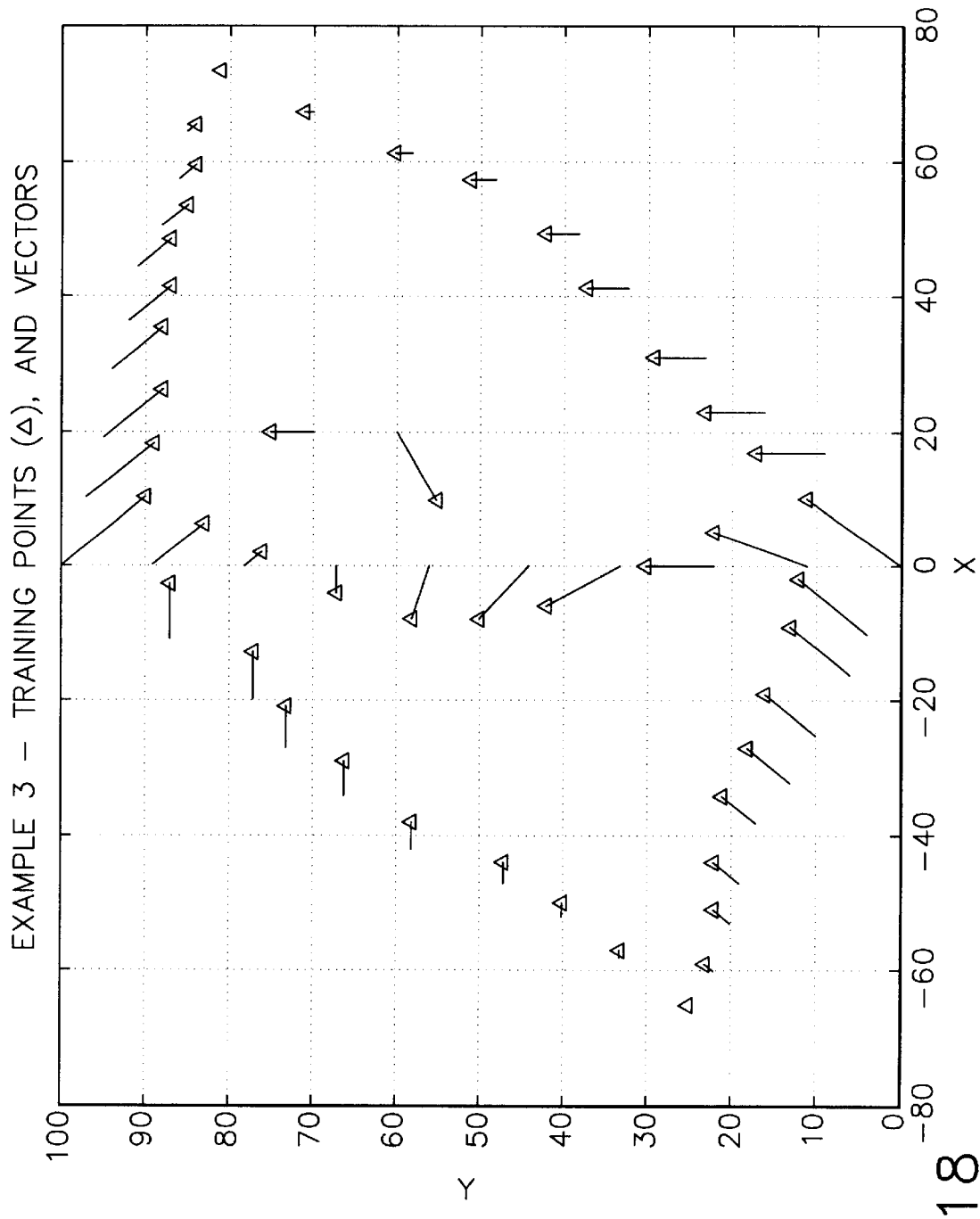
FIG. 18 is a graph of the training points and vectors used in Example 3.

A further example is now provided, i.e., Example 3. In this Example 3 the same input points are provided, along with the same training points. However, the two newly added training points from Example 2 have had their training weights changed from four (4)—which was used in Example 2—to one (1), so that these two particular training points have less effect in the final positions of the output points. FIG. 17 shows the input points on a graph, which is identical data to the earlier two examples as seen on FIGS. 7 and 12. FIG. 18 shows the training points and vectors, which is identical data to that depicted on FIG. 13 for Example 2.

Figure 19:
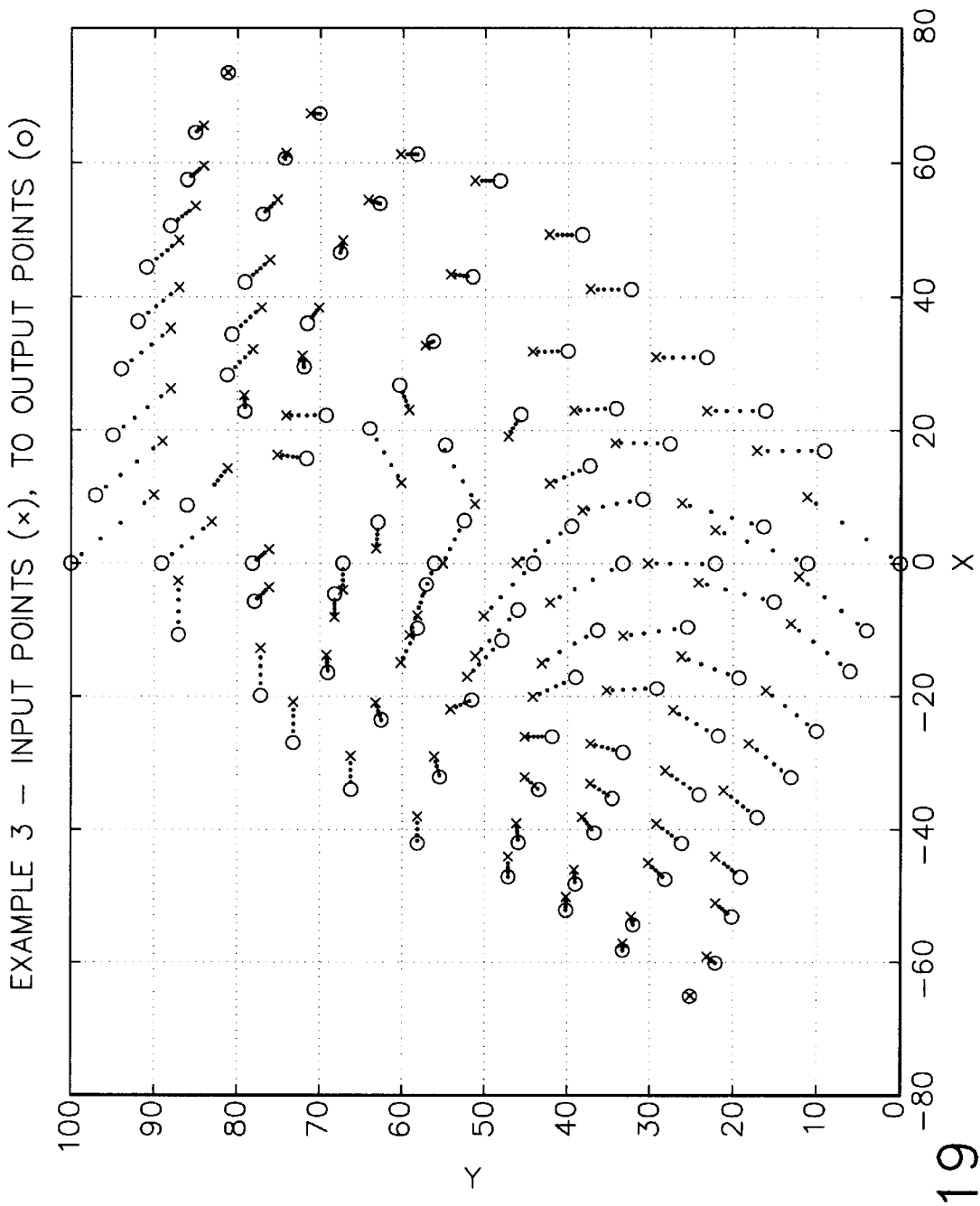
FIG. 19 is a graph showing the input points and output points, and their respective intermediate points for Example 3.
Figure 20:
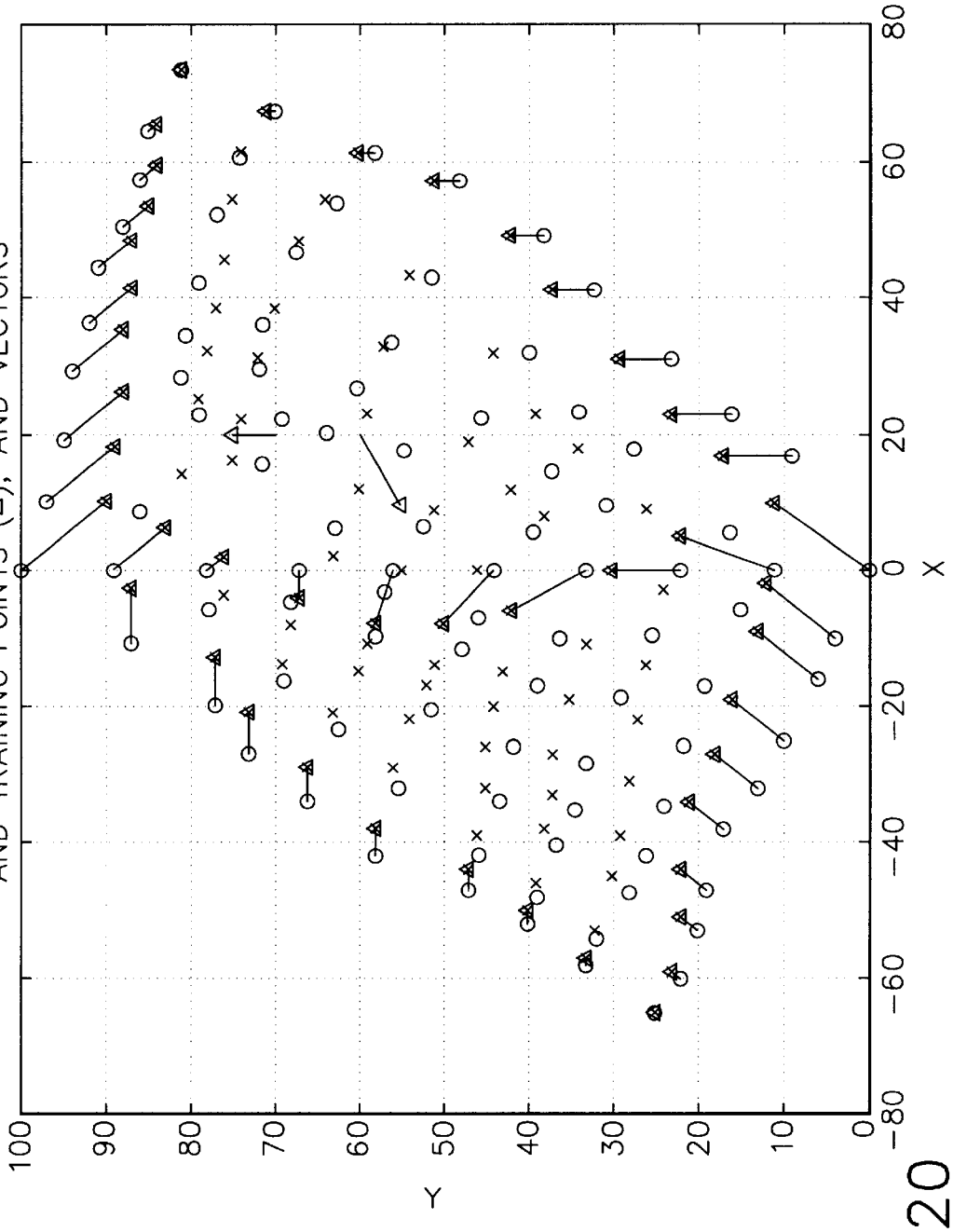
FIG. 20 is a graph of the input points, output points, training points, and training vectors for Example 3.

FIG. 19 shows the input points for Example 3, along with the intermediate positions and the final output point positions. FIG. 20 shows all of the input points, output points, training points, and training vectors for Example 3.

Figure 21:
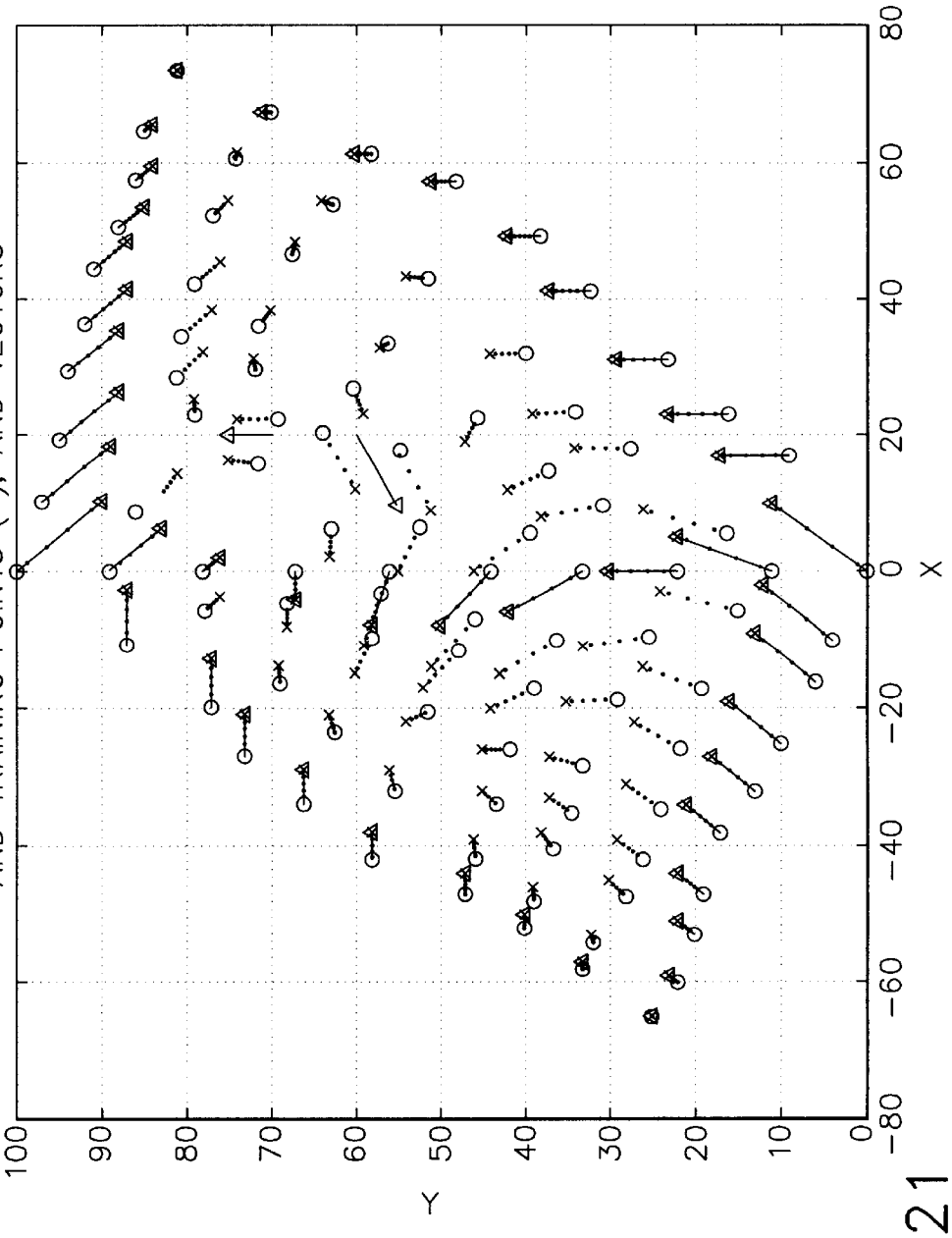
FIG. 21 is a graph showing the input points, output points, intermediate points, training points, and training vectors for Example 3.

FIG. 21 not only shows all the points depicted on FIG. 20, but also shows the intermediate points so it can be seen how the input points migrate to their final output point positions. FIG. 21 should be contrasted with FIG. 16, and it will be seen that the change in the training weight of the two additional training points has a different effect on some of the input points in the areas of the graph for the X-values between 10 and 30, and Y-values between −30 and +90.

The exact input point coordinates for Example 3 are provided immediately below in Table #5:

TABLE #5

EXAMPLE 3 - Input Points

| x | y | x | y | x | y | x | y |
|---|---|---|---|---|---|---|---|
| 10 | 90 | 31 | 72 | −38 | 58 | −19 | 35 |
| 18 | 89 | 38 | 70 | −29 | 56 | −11 | 33 |
| 26 | 88 | 48 | 67 | −22 | 54 | 0 | 30 |
| 35 | 88 | 54 | 64 | −17 | 52 | 9 | 26 |
| 41 | 87 | 61 | 60 | −14 | 51 | 23 | 23 |
| 48 | 87 | −21 | 73 | −8 | 50 | −57 | 33 |
| 53 | 85 | −14 | 69 | 0 | 46 | −53 | 32 |
| 59 | 84 | −8 | 68 | 12 | 42 | −45 | 30 |
| 65 | 84 | −4 | 67 | 23 | 39 | −39 | 29 |
| 73 | 81 | 2 | 63 | 41 | 37 | −31 | 28 |
| −3 | 87 | 12 | 60 | −44 | 47 | −22 | 27 |
| 6 | 83 | 23 | 59 | −39 | 46 | −14 | 26 |
| 14 | 81 | 33 | 57 | −32 | 45 | −3 | 24 |
| 25 | 79 | 43 | 54 | −26 | 45 | 5 | 22 |
| 32 | 78 | 57 | 51 | −20 | 44 | 17 | 17 |
| 38 | 77 | −29 | 66 | −15 | 43 | −65 | 25 |
| 45 | 76 | −21 | 63 | −6 | 42 | −59 | 23 |
| 54 | 75 | −15 | 60 | 8 | 38 | −51 | 22 |
| 61 | 74 | −11 | 59 | 18 | 34 | −44 | 22 |
| 67 | 71 | −8 | 58 | 31 | 29 | −34 | 21 |
| −13 | 77 | 0 | 55 | −50 | 40 | −27 | 18 |
| −4 | 76 | 9 | 51 | −46 | 39 | −19 | 16 |
| 2 | 76 | 19 | 47 | −38 | 38 | −9 | 13 |
| 16 | 75 | 32 | 44 | −33 | 37 | −2 | 12 |
| 22 | 74 | 49 | 42 | −27 | 37 | 10 | 11 |

The training points and their corresponding training vectors and training weights are described in their X- and Y-coordinates in Table #6, immediately below:

TABLE #6

EXAMPLE 3-Training Points

| Training Points | | Training Vectors | | Training Weights | Training Points | | Training Vectors | | Training Weights |
|---|---|---|---|---|---|---|---|---|---|
| x | y | x | y | w | x | y | x | y | w |
| 10 | 90 | −10 | 10 | 2 | 61 | 60 | 0 | −2 | 1 |
| 6 | 83 | −6 | 6 | 2 | −21 | 73 | −6 | 0 | 1 |
| 2 | 76 | −2 | 2 | 2 | 57 | 51 | 0 | −3 | 1 |
| −4 | 67 | 4 | 0 | 2 | −29 | 66 | −5 | 0 | 1 |
| −8 | 58 | 8 | −2 | 2 | 49 | 42 | 0 | −4 | 1 |
| −8 | 50 | 8 | −6 | 2 | −38 | 58 | −4 | 0 | 1 |
| −6 | 42 | 6 | −9 | 2 | 41 | 37 | 0 | −5 | 1 |
| 0 | 30 | 0 | −8 | 2 | −44 | 47 | −3 | 0 | 1 |
| 5 | 22 | −5 | −11 | 2 | 31 | 29 | 0 | −6 | 1 |
| 10 | 11 | −10 | −11 | 2 | −50 | 40 | −2 | 0 | 1 |
| 18 | 89 | −8 | 8 | 1 | 23 | 23 | 0 | −7 | 1 |

TABLE #6-continued

EXAMPLE 3-Training Points

| Training Points | | Training Vectors | | Training Weights | Training Points | | Training Vectors | | Training Weights |
|---|---|---|---|---|---|---|---|---|---|
| x | y | x | y | w | x | y | x | y | w |
| 26 | 88 | −7 | 7 | 1 | −57 | 33 | −1 | 0 | 1 |
| 35 | 88 | −6 | 6 | 1 | 17 | 17 | 0 | −8 | 1 |
| 41 | 87 | −5 | 5 | 1 | −65 | 25 | 0 | 0 | 1 |
| 48 | 87 | −4 | 4 | 1 | −59 | 23 | −1 | −1 | 1 |
| 53 | 85 | −3 | 3 | 1 | −51 | 22 | −2 | −2 | 1 |
| 59 | 84 | −2 | 2 | 1 | −44 | 22 | −3 | −3 | 1 |
| 65 | 84 | −1 | 1 | 1 | −34 | 21 | −4 | −4 | 1 |
| 73 | 81 | 0 | 0 | 1 | −27 | 18 | −5 | −5 | 1 |
| −3 | 87 | −8 | 0 | 1 | −19 | 16 | −6 | −6 | 1 |
| 67 | 71 | 0 | −1 | 1 | −9 | 13 | −7 | −7 | 1 |
| −13 | 77 | −7 | 0 | 1 | −2 | 12 | −8 | −8 | 1 |
|  |  |  |  |  | 10 | 55 | 10 | 5 | 1 |
|  |  |  |  |  | 20 | 75 | 0 | −5 | 1 |

As can be seen from these tables, the input point values for Table #5 are identical to those values for the earlier-described Table #1 and Table #3. Furthermore, the values for Table #6 are identical, except for certain training weights, to those values provided in Table #4.

It will be understood that any number of training points and corresponding training vectors can be used with the scattered data transformation method without departing from the principles of the present invention. It would even be possible to assign a training point for each input point that will be defined in the input color space. This, of course, is not necessary, and would defeat the need for any of the transformation equations described above. If there are going to be thousands of input points in a real-life application, the color space system designer would likely not desire to define each of those input points with a corresponding training point. Instead, the training points are most suitably used to define the outer areas of the color gamut in the input color space, to define the neutral gray colors (and typically to keep them relatively stable when moving from input color space to output color space), and finally to correct any irregularities in either color hue or in color smoothness in the input color space. Of course, the method of the present invention could also be used to transform an entire color gamut from one type of output device (such as a color monitor), and thereby convert that set of color information into a color gamut useful in a color printing device (which typically will have a much different color gamut).

It will also be understood that, while the individual training points and training vectors are typically in a one-to-one correspondence for the present invention, it would be possible to create a set of training points and a set of training vectors in which there are fewer training vectors than training points, particularly is situations where a particular training point does not move from the input color space to the output color space (i.e., where the training vector would have a zero magnitude). In this situation, the "zero" training vector could be eliminated, or at least replaced by a flag or other type of attribute that informs the scattered data transform that a particular training point will need no training vector (because it will not be displaced from input color space to output color space). Another situation where fewer training vectors than training points could be required is where the same spatial displacement is being defined for more than one training point (with or without a training weight consideration) and a single training vector could, therefore, be defined for more than one training point. Of course, in this second example, there would need to be a record (some type of "pointer," for example) of exactly which training vectors are assigned to which training points.

It will further be understood that the weighting factors are typically given integer values, however, these factors are not constrained to being integers with respect to the present invention. It will also be understood that the exact equations used to describe the function of the distance could be modified without departing from the principles of the present invention. Further, it will be understood that other equations disclosed in the Detailed Description of the Preferred Embodiment herein could be modified without departing from the principles of the present invention.

Once the output color space is defined by the method of the present invention, the set of output points is used to generate a look-up table that preferably will be used by the printer software driver in the host computer that provides print data to a color printer. While the final output space could be defined for a possible set of colors having the dimensions 256×256×256, for a total of 16 million potential colors, it is preferred to significantly reduce the number of possible color values that will define the look-up table. When actual color data is presented to the printer driver program at the host computer, it is then preferred that all of the color values of the print job be interpolated between nearby defined colors from the look-up table (i.e., the set of input points and output points), and then printed on the color printer using the color output space defined by these output point in the look-up table.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for transforming an n-dimensional color space, said method comprising:
   (a) selecting a plurality of input points in an input color space;
   (b) selecting a plurality of training points in said input color space;
   (c) selecting a plurality of training vectors, said training vectors corresponding to said plurality of training points;
   (d) defining a transform that will act upon said plurality of input points, said transform being automatically derived from said plurality of training points and training vectors, said transform having only a localized effect upon each of said plurality of input points; and
   (e) transforming said plurality of input points using said transform, thereby creating a plurality of output points in an output color space.

2. The method as recited in claim 1, wherein each of said plurality of training vectors is arranged in a one-to-one correspondence with one of said plurality of training points.

3. The method as recited in claim 2, further comprising a plurality of training weights that are arranged in a one-to-one correspondence with one of said plurality of training points.

4. The method as recited in claim 1, wherein at least one of said plurality of training points also has the same spatial coordinates as at least one of said plurality of input points in said n-dimensional space.

5. The method as recited in claim 4, wherein each of said plurality of input points that have the same spatial coordinates as one of said plurality of training points has its associated transformed output point exactly defined by that respective training point and its corresponding training vector.

6. The method as recited in claim 1, wherein each of said plurality of training points that has a corresponding training vector of zero-magnitude is located at the identical spatial coordinates in said output color space as its location in said input color space.

7. The method as recited in claim 6, wherein said localized effect upon said plurality of input points causes any one of said input points to remain stationary when being transformed from said input color space to said output color space if: (a) no training point and/or training vector comes within a "radius of effect" of such input point in said n-dimensional space; or (b) one or more non-moving training points only are located within said "radius of effect" to such input point in said n-dimensional space.

8. The method as recited in claim 1, wherein all of said plurality of input points, and all of said plurality of training points do not need to be uniformly spaced in n-dimensional space.

9. The method as recited in claim 1, wherein said transform comprises: selecting a radius of effect "r" around each of said plurality of input points in said n-dimensional input color space; applying a function of a vector distance "D" between each of said plurality of input points and each of said plurality of training points in said n-dimensional input color space; said function of D comprising an inversely exponential equation if D is less than r/2, said function of D comprising a polynomial equation that smoothly intersects said inversely exponential equation when D=r/2 and that smoothly approaches zero when D =r, said function of D equaling zero for values of D >r; and applying a differential vector quantity to each of said plurality of input points that is related to said function of D to create said plurality of output points.

10. The method as recited in claim 9, wherein said differential vector quantity applied to each of said plurality of input points is used in an equation:

$$Y_i = X_i + dX_i (i=1, \ldots, N);$$

where $X_i$ represents said plurality of input points in said input color space; $dX_i$ represents said differential vector quantity which affects the original positions of the input points, and is dependent upon the locations of said plurality of training points that are within r of said input points; and $Y_i$ represents said plurality of output points in said output color space.

11. The method as recited in claim 10, wherein said differential vector quantity $dX_i$ is calculated in segments by dividing each of said plurality of training vectors into equal segments, and calculating "D", said function of D, and intermediate output points $Y_i$ a plurality of times equal to the number of said equal segments of the training vectors, until all iterations of the calculations are performed to provide the entire effect of said training vectors.

12. The method as recited in claim 1, wherein said transform only affects selected regions of said n-dimensional color space as defined by said plurality of training points and training vectors.

13. The method as recited in claim 1, wherein said transform is used to redefine the color gamut of said input color space.

14. A method for transforming an n-dimensional color space, said method comprising:

(a) selecting a plurality of input points in an input color space;

(b) selecting a plurality of training points in said input color space;

(c) selecting a plurality of training vectors, said training vectors corresponding to said plurality of training points;

(d) defining a transform that will act upon said plurality of input points, said transform being automatically derived from said plurality of training points and training vectors, said transform only affecting selected regions of said n-dimensional color space as defined by said plurality of training points and training vectors; and (e) transforming said plurality of input points using said transform, thereby creating a plurality of output points in an output color space.

15. The method as recited in claim 14, wherein each of said plurality of training vectors is arranged in a one-to-one correspondence with one of said plurality of training points.

16. The method as recited in claim 15, further comprising a plurality of training weights that are arranged in a one-to-one correspondence with one of said plurality of training points.

17. The method as recited in claim 14, wherein at least one of said plurality of training points also has the same spatial coordinates as at least one of said plurality of input points in said n-dimensional space.

18. The method as recited in claim 17, wherein each of said plurality of input points that have the same spatial coordinates as one of said plurality of training points has its associated transformed output point exactly defined by that respective training point and its corresponding training vector.

19. The method as recited in claim 14, wherein each of said plurality of training points that has a corresponding training vector of zero-magnitude is located at the identical spatial coordinates in said output color space as its location in said input color space.

20. The method as recited in claim 19, wherein the effect of said transform only affecting selected regions of said n-dimensional color space causes any one of said input points to remain stationary when being transformed from said input color space to said output color space if: (a) no training point and/or training vector comes within a "radius of effect" of such input point in said n- dimensional space; or (b) one or more non-moving training points only are located within said "radius of effect" to such input point in said n-dimensional space.

21. The method as recited in claim 14, wherein all of said plurality of input points, and all of said plurality of training points do not need to be uniformly spaced in n-dimensional space.

22. The method as recited in claim 14, wherein said transform comprises: selecting a radius of effect "r" around each of said plurality of input points in said n-dimensional input color space; applying a function of a vector distance "D" between each of said plurality of input points and each of said plurality of training points in said n-dimensional input color space; said function of D comprising an inversely exponential equation if D is less than r/2, said function of D comprising a polynomial equation that smoothly intersects said inversely exponential equation when D=r/2 and that smoothly approaches zero when D=r, said function of D equaling zero for values of D>r; and applying a differential vector quantity to each of said plurality of input points that is related to said function of D to create said plurality of output points.

23. The method as recited in claim 22, wherein said differential vector quantity applied to each of said plurality of input points is used in an equation:

$$Y_i = X_i + dX_i (i=1, \ldots, N);$$

where $X_i$ represents said plurality of input points in said input color space; $dX_i$ represents said differential vector quantity which affects the original positions of the input points, and is dependent upon the locations of said plurality of training points that are within r of said input points; and $Y_i$ represents said plurality of output points in said output color space.

24. The method as recited in claim 23, wherein said differential vector quantity $dX_i$ is calculated in segments by dividing each of said plurality of training vectors into equal segments, and calculating "D", said function of D, and intermediate output points $Y_i$ a plurality of times equal to the number of said equal segments of the training vectors, until all iterations of the calculations are performed to provide the entire effect of said training vectors.

25. The method as recited in claim 14, wherein said transform is used to redefine the color gamut of said input color space.

* * * * *